(12) United States Patent
Jeng

(10) Patent No.: US 11,345,474 B2
(45) Date of Patent: May 31, 2022

(54) DRONE

(71) Applicant: HELENG INC., Temple City, CA (US)

(72) Inventor: Jack Ing Jeng, Arcadia, CA (US)

(73) Assignee: HELENG INC., Temple City, CA (US)

(*) Notice: Subject to any disclaimer, the term of this patent is extended or adjusted under 35 U.S.C. 154(b) by 0 days.

(21) Appl. No.: 17/304,083

(22) Filed: Jun. 14, 2021

(65) Prior Publication Data

US 2021/0403160 A1 Dec. 30, 2021

Related U.S. Application Data

(60) Provisional application No. 63/046,223, filed on Jun. 30, 2020.

(51) Int. Cl.
| | |
|---|---|
| *B64C 39/02* | (2006.01) |
| *B64C 1/16* | (2006.01) |
| *B64C 29/00* | (2006.01) |
| *B64D 27/24* | (2006.01) |
| *B64D 27/10* | (2006.01) |
| *B64C 39/08* | (2006.01) |
| *B64C 1/36* | (2006.01) |

(Continued)

(52) U.S. Cl.
CPC ............ *B64C 39/024* (2013.01); *B64C 1/068* (2013.01); *B64C 1/16* (2013.01); *B64C 1/36* (2013.01); *B64C 29/0033* (2013.01); *B64C 39/08* (2013.01); *B64D 27/10* (2013.01); *B64D 27/24* (2013.01); *F02C 7/264* (2013.01); *F23R 3/26* (2013.01); *H04B 7/0413* (2013.01);
(Continued)

(58) Field of Classification Search
CPC ......... B64C 39/024; B64C 1/068; B64C 1/16; B64C 1/36; B64C 29/0033; B64C 39/08; B64C 2001/0072; B64C 2201/021; B64C 2201/042; B64C 2201/048; B64C 2201/108; B64D 27/10; B64D 27/24; F02C 7/264; F23R 3/26; F05D 2220/323; H04B 7/0413
See application file for complete search history.

(56) References Cited

U.S. PATENT DOCUMENTS

| 2,304,136 A | 12/1942 | Woods |
| 8,094,083 B1 | 1/2012 | Tam et al. |

(Continued)

FOREIGN PATENT DOCUMENTS

| DE | 3937910 A1 | 5/1991 |
| WO | 9965767 A1 | 12/1999 |
| WO | 2020016890 A1 | 1/2020 |

OTHER PUBLICATIONS

International Search Report and Written Opinion dated Sep. 17, 2021 for PCT Patent Application No. PCT/IB2021/055231.

(Continued)

*Primary Examiner* — Medhat Badawi
(74) *Attorney, Agent, or Firm* — MLO, a professional corp.

(57) ABSTRACT

A drone includes a frame and a fuselage. The fuselage is coupled to the frame extending away from the frame. The fuselage has a front panel and a bottom panel, and the front panel is positioned at an angle between the bottom surface of the frame and the bottom panel of the fuselage. A first wing is opposite a second wing and are coupled to the frame. The first and second wings extend outwardly from opposite sides of the frame. A first and second mounting member are coupled to the frame and extend outwardly from opposite sides of the frame. A plurality of power generator systems are included and each system is coupled to the first or second mounting member. Each power generator system comprises a power source coupled to a propeller.

10 Claims, 34 Drawing Sheets

(51) Int. Cl.
  *F02C 7/264*   (2006.01)
  *F23R 3/26*    (2006.01)
  *H04B 7/0413*  (2017.01)
  *B64C 1/06*    (2006.01)
  *B64C 1/00*    (2006.01)
  *B64D 27/02*   (2006.01)

(52) U.S. Cl.
  CPC .......................... *B64C 2001/0072* (2013.01); *B64C 2201/021* (2013.01); *B64C 2201/042* (2013.01); *B64C 2201/048* (2013.01); *B64C 2201/108* (2013.01); *B64D 2027/026* (2013.01); *F05D 2220/323* (2013.01)

(56) References Cited

U.S. PATENT DOCUMENTS

| | | |
|---|---|---|
| 8,116,763 B1 | 2/2012 | Olsen |
| 8,248,317 B1 | 8/2012 | Meagher et al. |
| 9,100,086 B1 | 8/2015 | Olsen |
| 9,780,448 B1 | 10/2017 | Meagher et al. |
| 2018/0155021 A1 | 6/2018 | Patterson et al. |

OTHER PUBLICATIONS

Nelson, Vendors lengthen the range of 5G millimeter-wave transmissions, Network World, Sep. 23, 2020, 2 pages. Accessed Online:https://www.networkworld.com/article/3575361/vendors-lengthen-the-range-of-5g-millimeter-wave-transmissions.html.

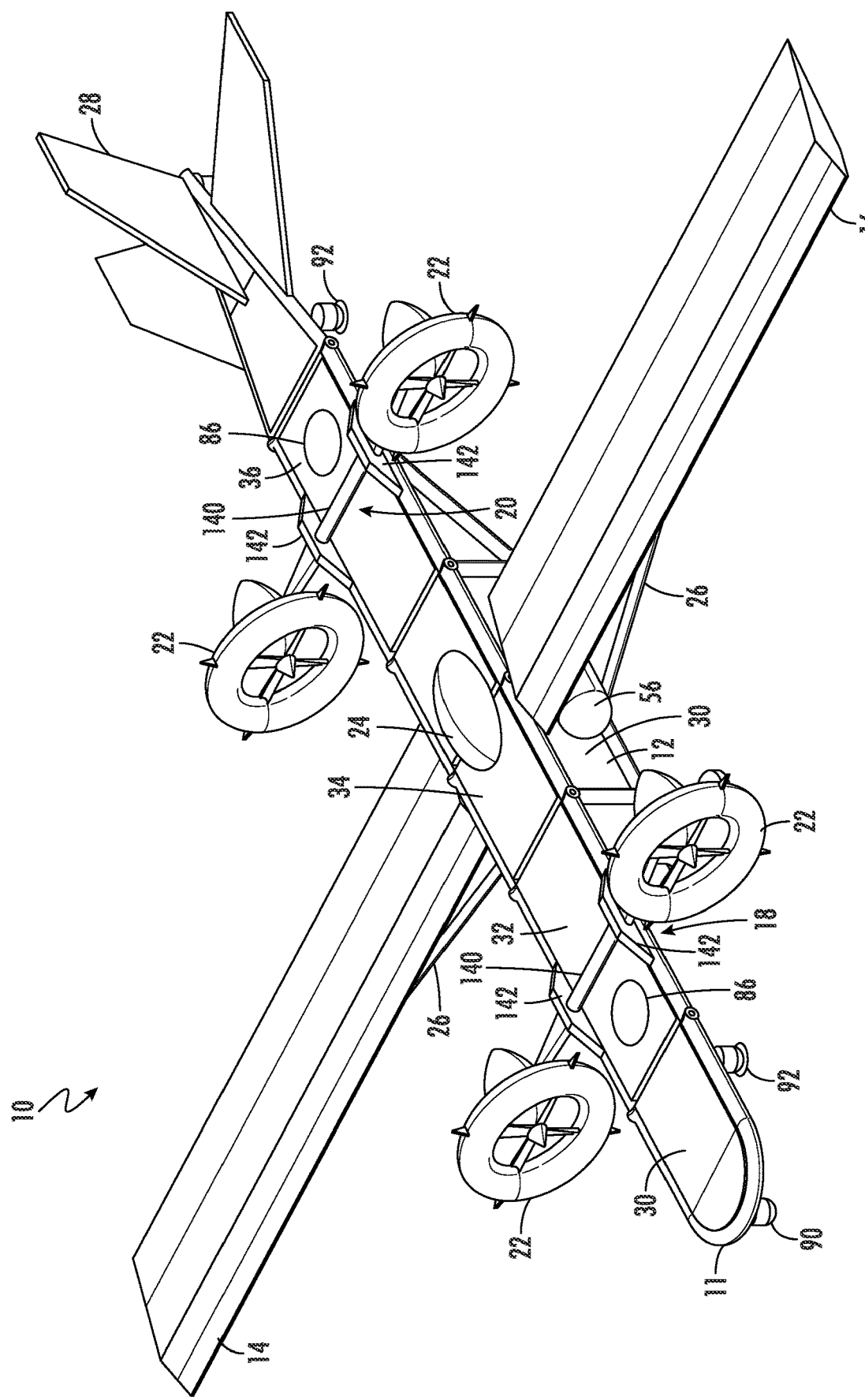

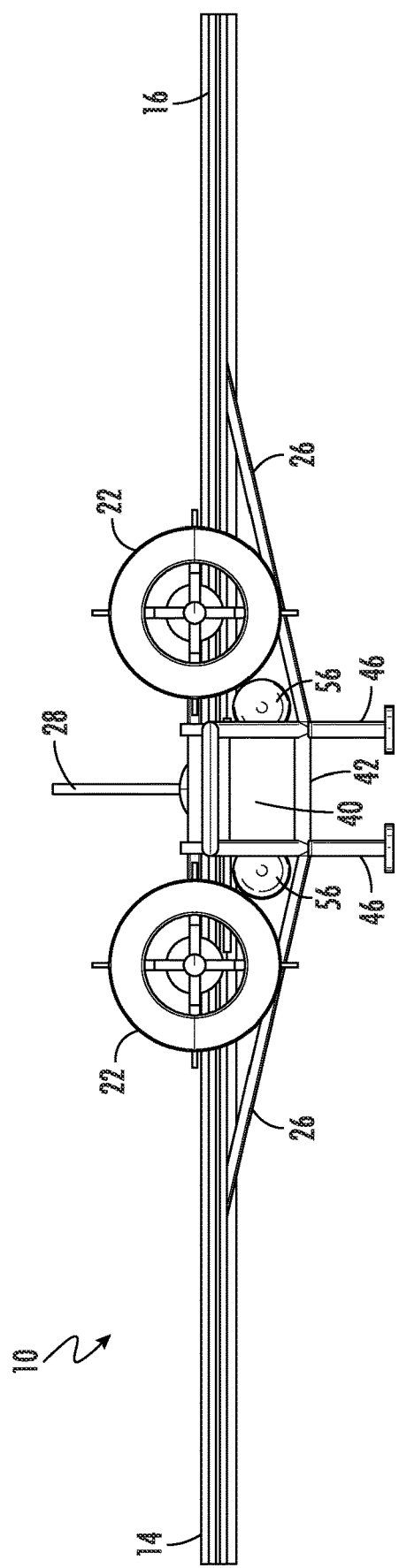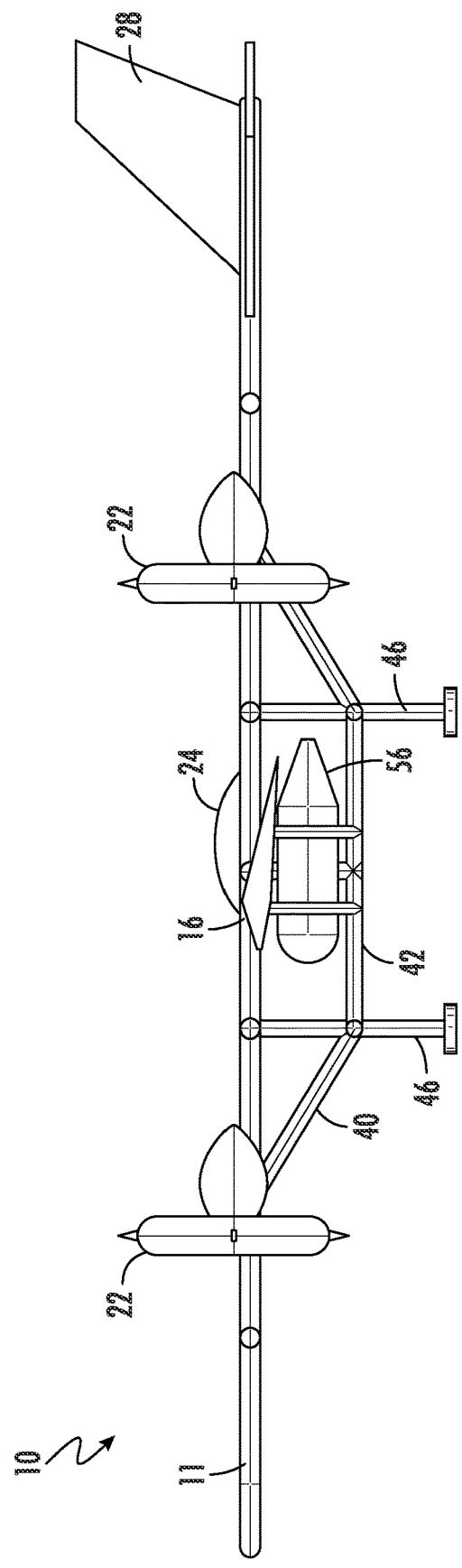

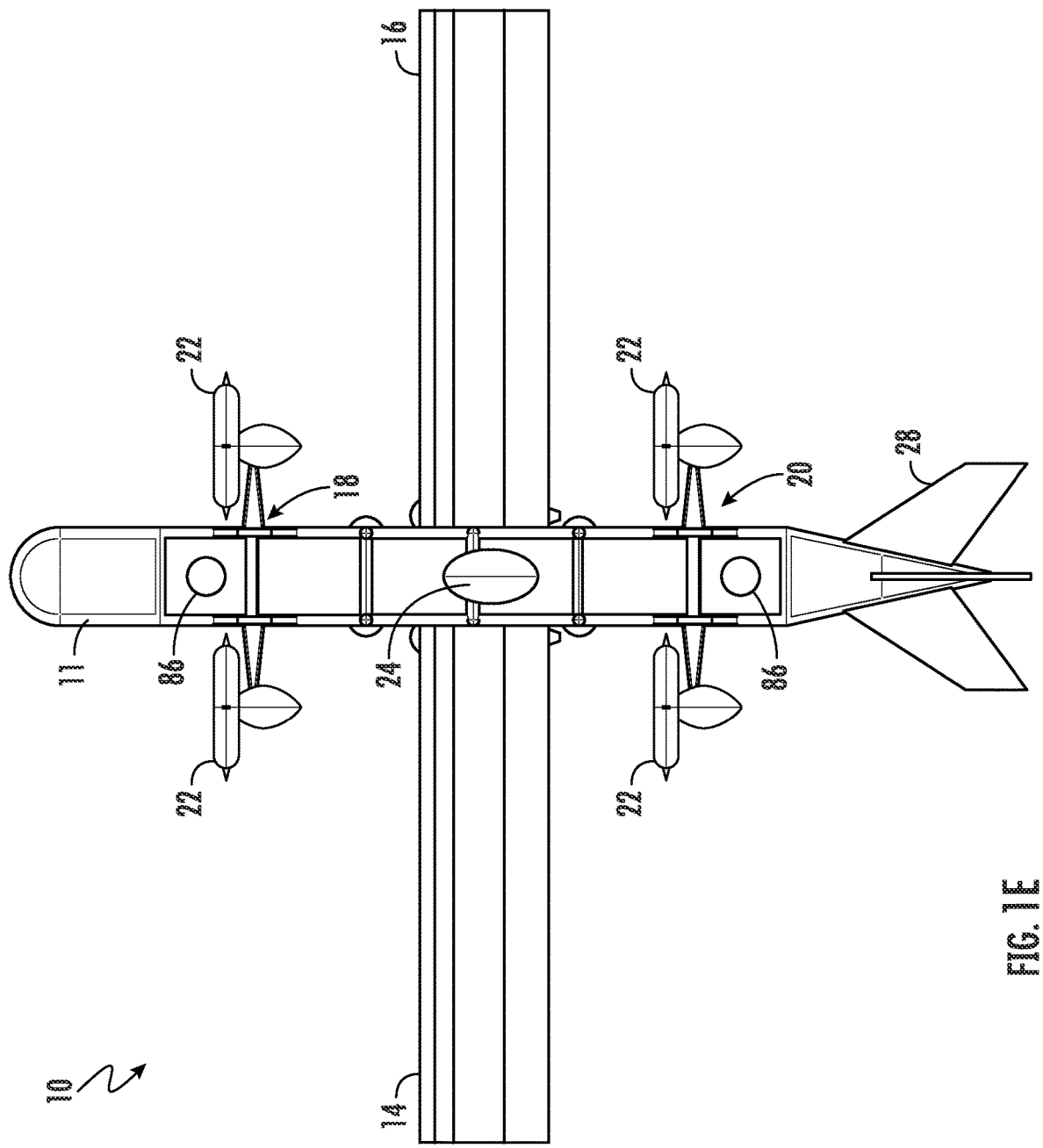

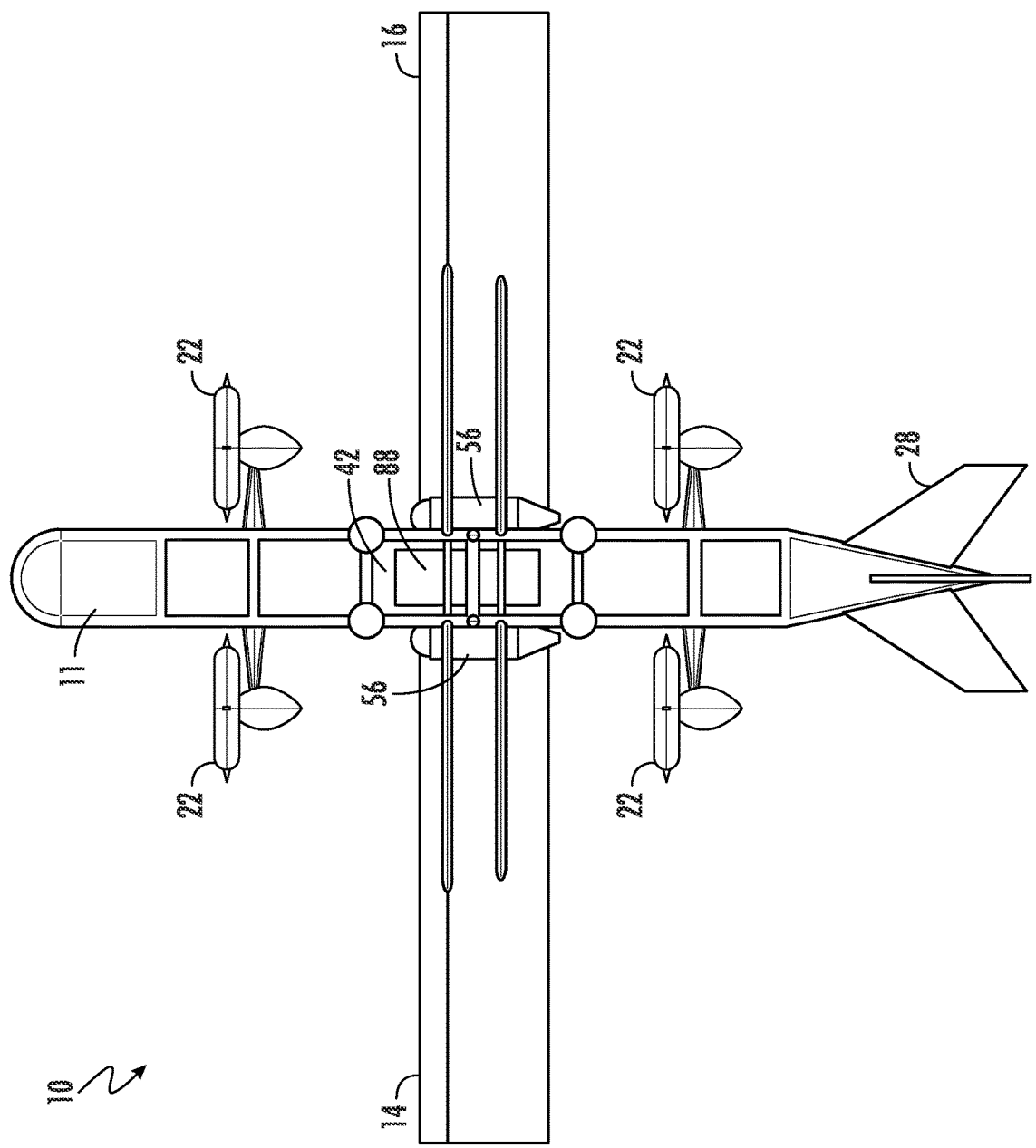

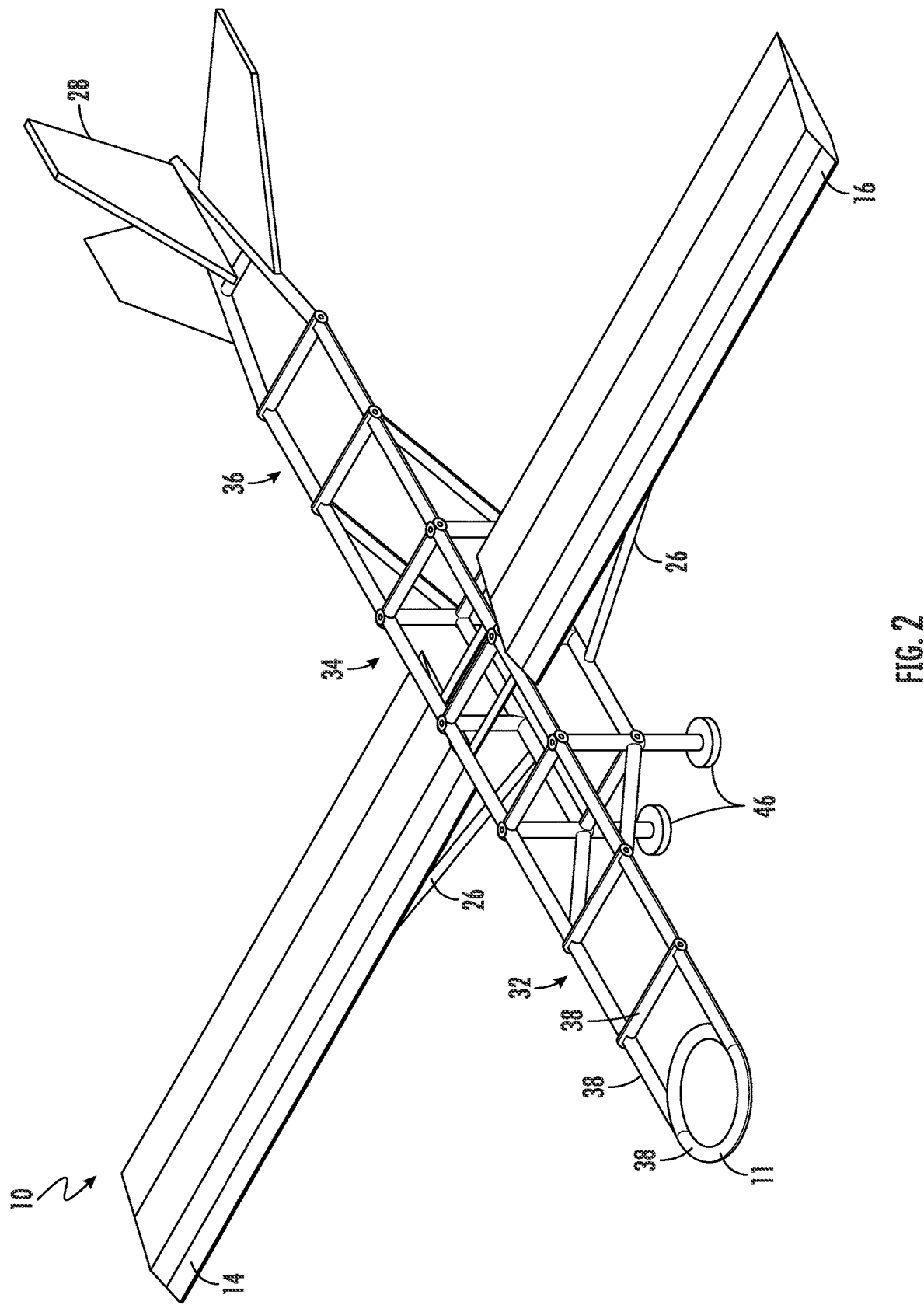

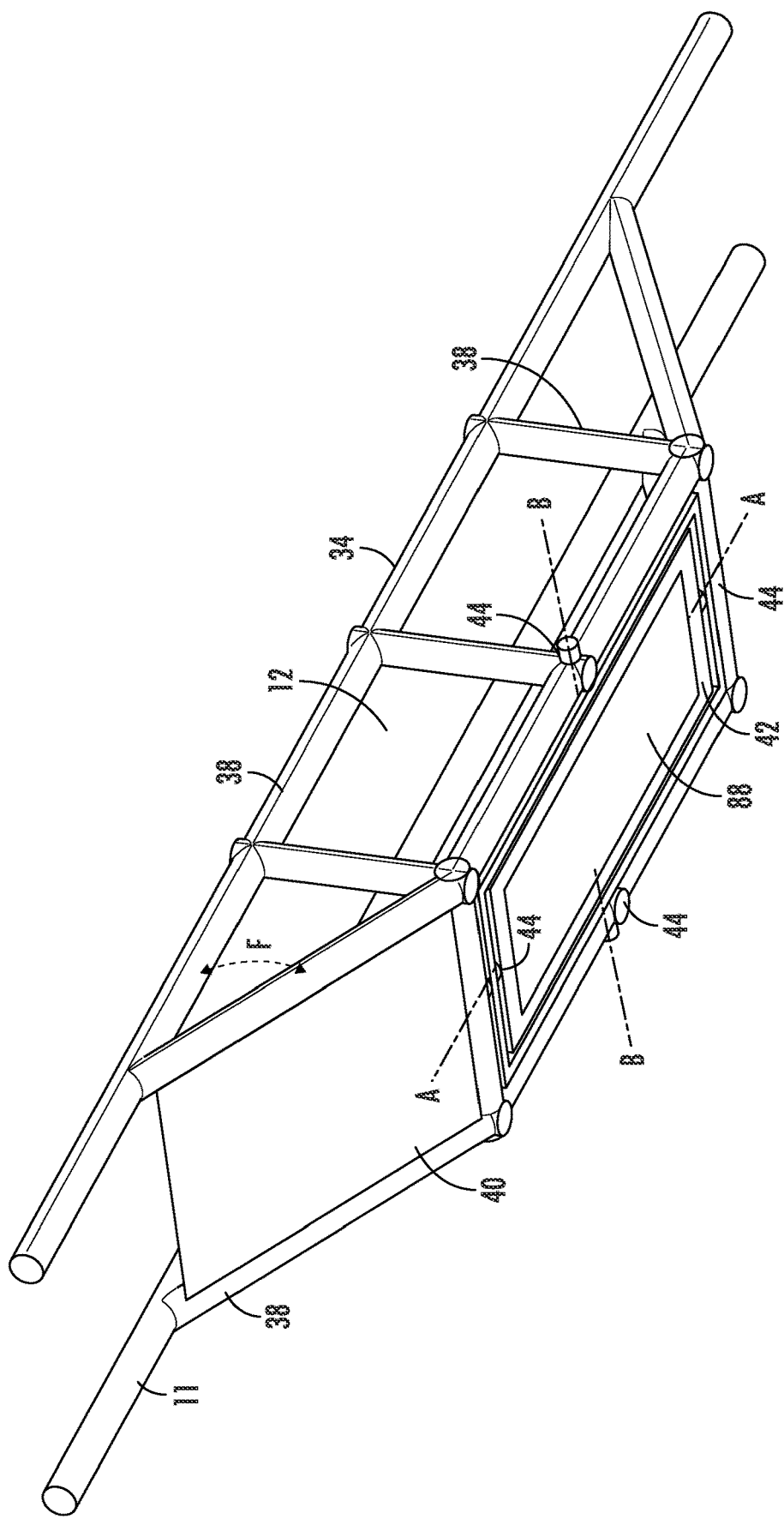

$$F = 1.225 \frac{(0.0254 \cdot d)^2}{4} \left[ \left( RPM_{prop} \cdot 0.0254 \cdot PITCH \frac{1 MIN}{60 SEC} \right)^2 \right.$$

FIG. 11A

| PROPELLER INPUTS | | | | | |
|---|---|---|---|---|---|
| DIAM, d (in): | 92.5 | PITCH (IN): | 25 | RPMs: | 4000 |

TABLE 11B

FIG. 11B

| | X | | Y | | | | |
|---|---|---|---|---|---|---|---|
| | AIRCRAFT AIRSPEED, $V_0$ (M/S) | AIRCRAFT AIRSPEED, $V_0$ (MPH) | DYNAMIC THRUST, F (N) | DYNAMIC THRUST, F (g) | DYNAMIC THRUST, F (kg) | DYNAMIC THRUST, F (oz) | DYNAMIC THRUST, F (lb) |
| STATIC THRUST --> ALL OTHERS ARE DYNAMIC THRUST | 0 | 0 | 11323.23 | 1154254 | 1154.25 | 40715.1 | 2544.69 |
| | 0.44704 | 1 | 11203.656 | 1142065 | 1142.06 | 40285.2 | 2517.82 |
| | 0.89408 | 2 | 11084.083 | 1129876 | 1129.88 | 39855.2 | 2490.95 |
| | 1.34112 | 3 | 10964.51 | 1117687 | 1117.69 | 39425.3 | 2464.08 |
| | 1.78816 | 4 | 10844.937 | 1105498 | 1105.5 | 38995.3 | 2437.2 |
| | 2.2352 | 5 | 10725.363 | 1093309 | 1093.31 | 38565.4 | 2410.33 |
| | 2.68224 | 6 | 10605.79 | 1081120 | 1081.12 | 38135.4 | 2383.46 |
| | 3.12928 | 7 | 10486.217 | 1068931 | 1068.93 | 37705.5 | 2356.59 |
| | 3.57632 | 8 | 10366.643 | 1056742 | 1056.74 | 37275.5 | 2329.72 |
| | 4.02336 | 9 | 10247.07 | 1044554 | 1044.55 | 36845.6 | 2302.84 |
| | 4.4704 | 10 | 10127.497 | 1032365 | 1032.36 | 36415.6 | 2275.97 |
| | 4.91744 | 11 | 10007.923 | 1020176 | 1020.18 | 35985.7 | 2249.1 |
| | 5.36448 | 12 | 9888.3501 | 1007987 | 1007.99 | 35555.7 | 2222.23 |
| | 5.81152 | 13 | 9768.7768 | 995798 | 995.798 | 35125.8 | 2195.36 |
| | 6.25856 | 14 | 9649.2035 | 983609 | 983.609 | 34695.8 | 2168.48 |
| | 6.7056 | 15 | 9529.6302 | 971420 | 971.42 | 34265.9 | 2141.61 |

TABLE 11C

FIG. 11C

FIG. 14A $$C_L = \frac{2L}{\rho V^2 A}$$

FIG. 14B

WING AREA CALCULATION

| MODEL- | LENGTH (FT) | WIDTH (FT) | QTY | QTY | |
|---|---|---|---|---|---|
| MAIN WINGS | 35 | 10 | 2 | 700 | |
| SUB-WINGS | 35 | 10 | 2 | 700 | |
| | | | TOTAL AREA | 1400 | FT^2 |

TABLE 14B

FIG. 14C

| V= | 70 | km/hr | | V= | 70 | km/hr |
|---|---|---|---|---|---|---|
| ρ | 1.13 | kg/m^3 | | ρ | 1.13 | kg/m^3 |
| MODEL- | 1400 | FOOT^2 | | MODEL-A | 1400 | FOOT^2 |
| WING AREA | | | | WING AREA | | |
| CL | 1.45 | (NORMAL FLAP) | | CL | 2.25 | (PLAIN FLAP) |
| CONVERSION | 5620055 | 1368 | | CONVERSION | 53837443.75 | 1368 |
| LIFT= | 4108.23 | Kg FORCE | | LIFT= | 3935.485 | Kg FORCE |

TABLE 14C

| | | $C_{L, MAX}$ | $\Delta C_{L, MAX}$ |
|---|---|---|---|
| PLAIN AIRFOIL |  | 1.45 | - |
| PLAIN FLAP |  | 2.25 | 0.80 |
| SINGLE-SLOTTED FLAP |  | 2.60 | 1.15 |
| DOUBLE-SLOTTED FLAP |  | 2.80 | 1.35 |
| SPLIT FLAP |  | 2.40 | 0.95 |
| ZAP-FLAP |  | 2.50 | 1.05 |
| DOUBLE WING (JUNKERS) | 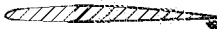 | 2.25 | 0.80 |
| FOWLER-FLAP | 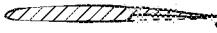 | 2.80 | 1.35 |
| SLAT | 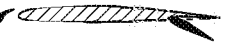 | 2.00 | 0.55 |
| SLAT AND PLAIN FLAP |  | 2.45 | 1.00 |
| SLAT AND SINGLE SLOTTED FLAP |  | 2.70 | 1.25 |
| SLAT AND DOUBLE SLOTTED FLAP | 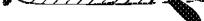 | 2.90 | 1.45 |
| SLAT AND FOWLER-FLAP |  | 3.00 | 1.5 |
FIG. 14D

DRONE

RELATED APPLICATIONS

This application claims priority to U.S. Provisional Patent Application No. 63/046,223 filed on Jun. 30, 2021 and entitled "Drone System," which is hereby incorporated by reference in full.

BACKGROUND

Drones have gained popularity because of the suitability for a broad range of applications. Drones are Unmanned Aerial Vehicles (UAV) and may be used for aerial photography, product deliveries, military operations, agriculture, policing and surveillance, infrastructure inspections, and science. The design variation among drones is vast and may be categorized according to configuration, engine type and operational role. For example, the configuration of drones may be fixed winged, blended wing-body designs or flapping-wing ornithopters. The engine design may be internal combustion, jet engine, rotary engines, piston engines or electric engines. Small drones mostly use lithium-polymer batteries while some larger drones use hydrogen fuel cells. The design of the drone may enable it to be used as a base station for providing wireless communication to subscribers or user equipment.

As internet traffic has increased, new technologies are needed to deliver broadband access to user equipment in homes and businesses. Cellular communications systems are well known in the art. In a typical cellular communications system, a geographic area is divided into a series of regions that are referred to as cells and each cell is served by a base station. The base station provides two-way communications with mobile and fixed subscribers that are located throughout the cell. The antennas are often mounted on a tower or other raised structure, with the antenna beam that is generated by each antenna directed outwardly to serve the entire cell or a sector of the cell such as a wedge-shaped section of the cell. Typically, the antenna provides full 360-degree coverage (omnidirectional coverage) in the azimuth plane and a suitable beamwidth in the elevation plane to cover the designed area. Cellular communications systems are not available in remote areas, and may not be practical when the subscriber, such as while in an aircraft or vehicle, is traveling at high speeds.

Geosynchronous satellites are also known in the art and are located in outer space or at least 22,000 miles away from earth and are typically used for various purposes, such as voice communication, Internet, broadcasting satellite television and radio signals, weather forecasting and communicating back and forth with spacecraft. A geosynchronous satellite is very expensive and difficult to implement. Another example of a satellite for communications is Low Earth Orbit (LEO) satellites. For example, thousands of conventional LEO satellites are needed to provide satellite communications. The LEO satellites are positioned 350 km to 1,000 km above the ground and orbit the earth. Many LEO satellites are needed to service an area because the LEO satellites are constantly orbiting the earth, so when one LEO satellites moves out of range, another LEO satellite is needed to take over. LEO satellites have a high cost of hardware cost and implementation. In general, the further away the satellite is positioned, the more power is required to transmit.

SUMMARY

A drone is disclosed and includes a frame having a front section, a center section, and a rear section. A fuselage is coupled to a bottom surface of the center section of the frame extending away from the frame. The fuselage has a front panel and a bottom panel. The front panel is positioned at an angle between the bottom surface of the frame and the bottom panel of the fuselage. A first wing is opposite a second wing, and the first and second wings are coupled to the center section of the frame. The first and second wings extend outwardly from opposite sides of the frame. A first mounting member is coupled to the front section of the frame and extends outwardly from opposite sides of the front section of the frame. A second mounting member is coupled to the rear section of the frame and extends outwardly from opposite sides of the rear section of the frame. A plurality of power generator systems are included, and each power generator system is coupled to the first mounting member or the second mounting member. Each power generator system comprises a power source coupled to a propeller and driving the propeller. The propeller has a propeller axis of rotation, and the propeller pivots between a first orientation and a second orientation. The second orientation is perpendicular to the first orientation.

A drone is disclosed and includes a frame and a fuselage coupled to a bottom surface of the frame extending away from the frame. The fuselage has a front panel and a bottom panel. The front panel is positioned at an angle between the bottom surface of the frame and the bottom panel of the fuselage, and the bottom panel is pivotably coupled to the fuselage. A first wing is opposite a second wing, and the first and second wings are coupled to the frame. The first and second wings extend outwardly from opposite sides of the frame. A first subwing is coupled to the frame positioned forward of the first and second wings, and extends outwardly from opposite sides of the frame. A second subwing is coupled to the frame positioned rearward of the first and second wings, and extends outwardly from opposite sides of the frame. A first mounting member is coupled to the frame and extends outwardly from opposite sides of the frame. A second mounting member is coupled to the frame and extends outwardly from opposite sides of the frame. A plurality of power generator systems are included and each power generator system is coupled to the first mounting member or the second mounting member. Each power generator system comprises a power source coupled to a propeller driving the propeller.

BRIEF DESCRIPTION OF THE DRAWINGS

FIGS. 1A and 1B are perspective views of a drone, in accordance with some embodiments.

FIG. 1C is a front view of a drone, in accordance with some embodiments.

FIG. 1D is a side view of a drone, in accordance with some embodiments.

FIG. 1E is a top view of a drone, in accordance with some embodiments.

FIG. 1F is a bottom view of a drone, in accordance with some embodiments.

FIG. 2 is a perspective view of the frame of the drone, in accordance with some embodiments.

FIG. 3A is a perspective view of a partial portion of the frame of the drone, in accordance with some embodiments.

FIG. 11A shows a formula for calculating thrust.

FIG. 11B shows Table 11B of sample parameters for the propeller, in accordance with some embodiments.

FIG. 11C shows Table 11C of the results for calculations, in accordance with some embodiments.

FIG. 14A shows a formula for calculating lift.

FIG. 14B shows Table 14B of sample calculations of wing area of the drone, in accordance with some embodiments.

FIG. 14C shows Table 14C of sample calculations for lift of the drone, in accordance with some embodiments.

FIG. 14D is a chart of wing design profiles and lift coefficient $C_L$.

DETAILED DESCRIPTION

Figure 1B:
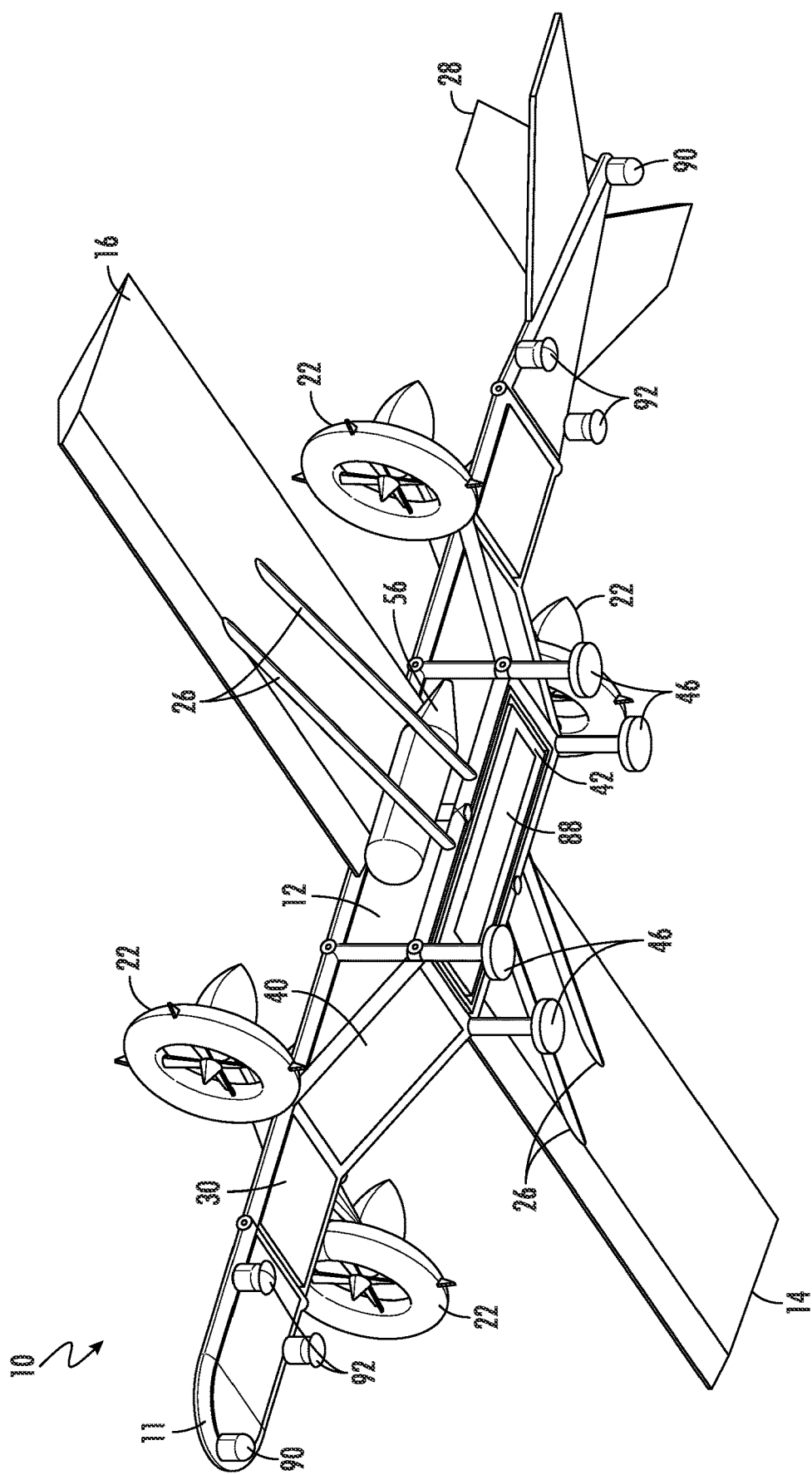

An autonomous drone is disclosed that is a vertical take-off and landing (VTOL) drone. The drone includes a frame, fuselage, fixed wings, and a plurality of power generator sources. The frame, fuselage and fixed wings are comprised of a plurality of structural elements forming a desired shape with a sheet of material enclosing the plurality of structural elements. The plurality of structural elements are comprised of a lightweight material, such as carbon fiber, which is known to be strong and lightweight, having a high strength-to-weight ratio. This enables the drone to be lightweight while in some embodiments, carrying a payload of up to 2,500 kg.

Lift is the force that holds an aircraft in the air, and can be generated by any part of the drone. Lift is directly proportional to area so increasing the surface area of the components, such as the wings, may increase the lift. The drone includes fixed wings, a front panel and subwings to increase lift by increasing the surface area. For example, the large, fixed wings of the drone have a wingspan of up to 76.5 feet in some embodiments. The fuselage includes an angled, flat front panel rather than a dome-shaped front nose, as in conventional aircraft, to add surface area. In some embodiments, subwings which have a length less than a length of the wings, are coupled to the frame and fuselage. The lift allows the drone to hover in a small area for long periods of time. In contrast, generally aircrafts are not designed to hover and if hovering is possible, it is for short durations of time such as a few minutes.

The plurality of power generator sources are located close to the frame of the drone as opposed to the ends of the fixed wings. In this way, the weight is distributed at the center of the drone enabling the drone to be stable and steady during operation such as during take-off, in flight and landing. The plurality of power generator systems provide redundancy in case of one power generator system malfunction or failure while producing the thrust for vertical take-off and landing. Each power generator system is independent from one another and additional power generator systems can be easily integrated for more power and thrust, enabling flexible scalable expansion and a safety feature.

Each power generator system comprises a power source coupled to a propeller and drives the propeller. The propeller is pivotable between a first orientation and a second orientation, and the second orientation is perpendicular to the first orientation. For example, the first position may be a 0° horizontal position and the second position may be a 90° vertical position. This enables a high amount of maneuverability of the drone in roll, pitch and yaw directions while enabling vertical take-off and landing.

Each power generator system may include a fuel powered engine such as a gasoline turbine engine. This allows a great amount of thrust for lift to be generated since gasoline has a gasoline energy density that is 50-100 times more powerful than a lithium battery, whereby lithium batteries are typically used to power conventional drones. Each power generator system may also include an axial flux motor to provide the electrical power for the drone.

The lightweight design, increased lift and the amount of thrust that the drone generates due to the power sources, enable the drone to hover in a small area for an extended amount of time. In some embodiments, the drone is a wireless communications base station that utilizes a first antenna array via satellite communication connecting subscribers or user equipment to the internet cloud. The drone also includes an adjustable second antenna array via broadband communication connecting subscribers or user equipment to the internet cloud by a mmWave Link (e.g., 20 Gb/s) to a ground station. The second antenna array is coupled to the bottom panel of the fuselage which is adjustable about two axes. This enables the second antenna array to maintain a fixed position for large area of ground customer subscribers, and reduce complicated beamforming direction calculations because the drone is hovering over the service area.

FIGS. 1A and 1B are perspective views of a drone, in accordance with some embodiments. The drone 10 includes a frame 11, fuselage 12, first wing 14, second wing 16, first mounting member 18, second mounting member 20, plurality of power generator systems 22, parachute system 24 (also see FIG. 13), plurality of wing braces 26, and rear rudder 28. In accordance with some embodiments, FIG. 1C is a front view of a drone, FIG. 1D is a side view of a drone, FIG. 1E is a top view of a drone, and FIG. 1F is a bottom view of a drone. In an example embodiment, the drone 10 may have a wingspan of 76.5 feet, an overall length of 65.5 feet, and a width of the frame may be 7.5 feet.

FIG. 2 is a perspective view of the frame of the drone, in accordance with some embodiments. As shown, a cover 30 (see FIGS. 1A and 1B) is removed from the frame 11. The frame 11 of the drone 10 has a front section 32, a center section 34, and a rear section 36, and is comprised of a plurality of structural elements 38 forming a desired shaped such as the frame 11. The plurality of structural elements 38 may be, for example, linear or curved segments such as longitudinal rods or tubes with crossbeams in a planar configuration. The plurality of structural elements 38 may be comprised of carbon fiber which is known to be strong and lightweight, having a high strength-to-weight ratio. This enables the drone 10 to have a strong, stiff, and rigid structure. In some embodiments, the plurality of structural elements 38 may be comprised of aluminum, steel, composite material or combination thereof. The desired shape of the plurality of structural elements 38 are covered with a material such as a neoprene skin, nylon or a lightweight polymer material forming the cover 30 (see FIGS. 1A and 1B). The cover 30 extends over and across the plurality of structural elements 38 and the entirety of the frame 11 forming a solid structure.

The construction of the frame 11 is a modular approach and allows for a flexible arrangement, ease of assembly and repair, and expandability such as by adding structural elements 38 to frame 11 to increase the overall length of the drone. With this flexible approach, the length of the drone can be customized per application. The cover 30 is designed to provide a lightweight, flexible, ozone proof, waterproof and heat insulation material for protection of the frame 11.

FIG. 3A is a perspective view of a partial portion of the frame of the drone, in accordance with some embodiments. As shown, the cover 30 (see FIGS. 1A and 1B) is removed from the frame 11 and fuselage 12. Referring to FIG. 1B, the fuselage 12 is coupled to a bottom surface of the center section 34 of the frame 11 extending away from the frame 11. Similar to the construction of the frame 11, the fuselage 12 is comprised of the plurality of structural elements 38 as described herein and the cover 30 extends over and across the plurality of structural elements 38 and the entirety of the fuselage 12. Since the drone 10 is autonomous and unmanned, it is not necessary to incorporate passenger safety standards in the design of the fuselage 12. This allows for less components thereby reducing the weight. The fuselage 12 has a front panel 40 and a bottom panel 42.

Typically, aerial vehicles have a dome-shaped or "pointed nose" on the front end for aerodynamics and aesthetics. The front panel 40 of the drone 10, is a flat, planar panel and is positioned at an angle between the bottom surface of the frame 11 and the bottom panel 42 of the fuselage 12. For example, the angle of the front panel 40 relative to the bottom surface of the frame 11 may be an oblique angle or an angle less than 90 degrees. The angle F is shown as label F. A top edge of the front panel 40 is coupled to the bottom surface of the frame 11 and the bottom edge of the front panel 40 extends toward the rear section 36 of the frame 11. With the front panel 40 positioned in this manner, there is increased surface area which acts similar to a wing and increases the lift.

Figure 3B:
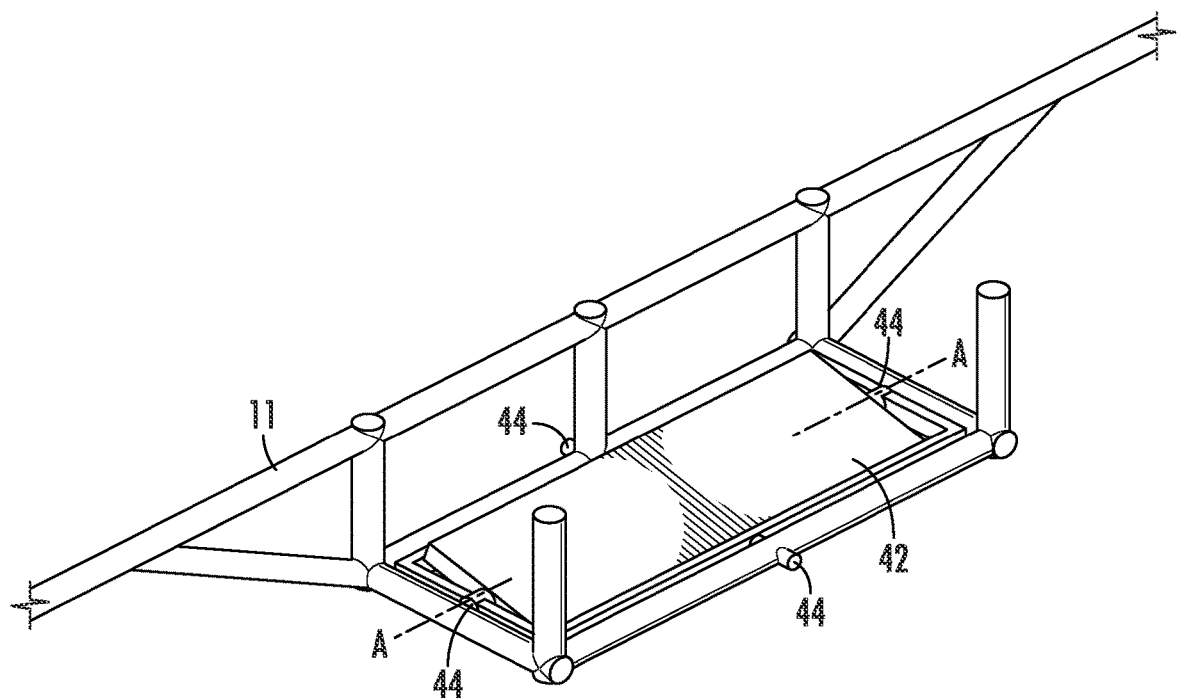
FIGS. 3B-3D illustrate the bottom panel pivoted in various positions, in accordance with some embodiments.
Figure 3C:
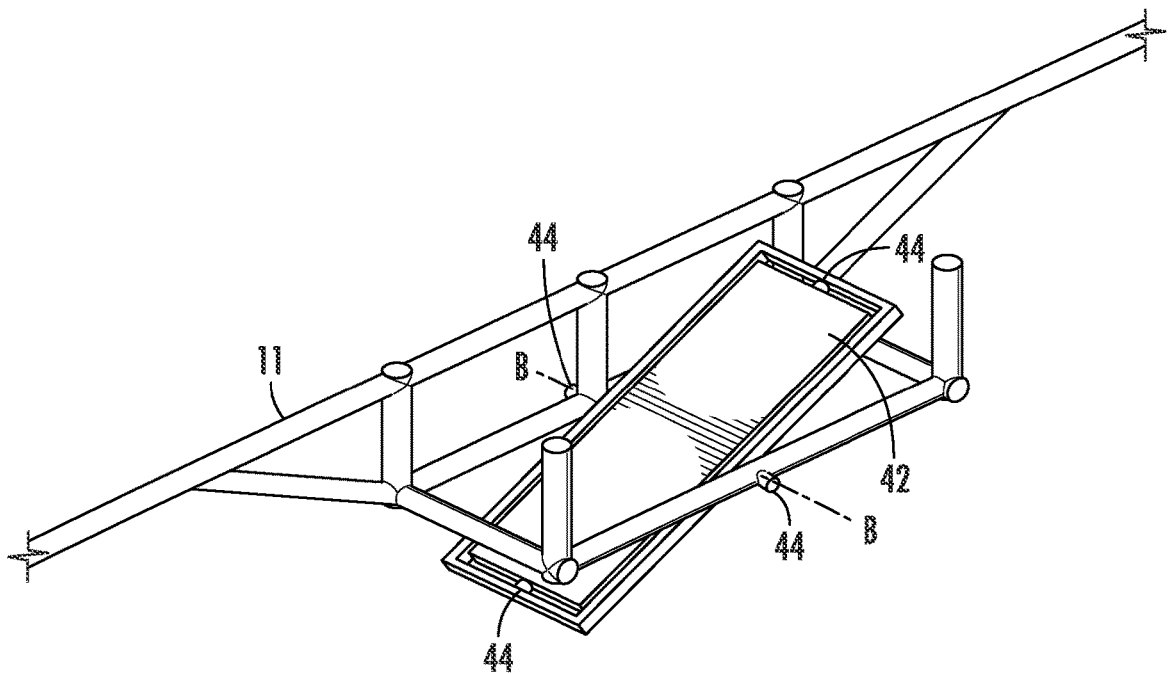
Figure 3D:
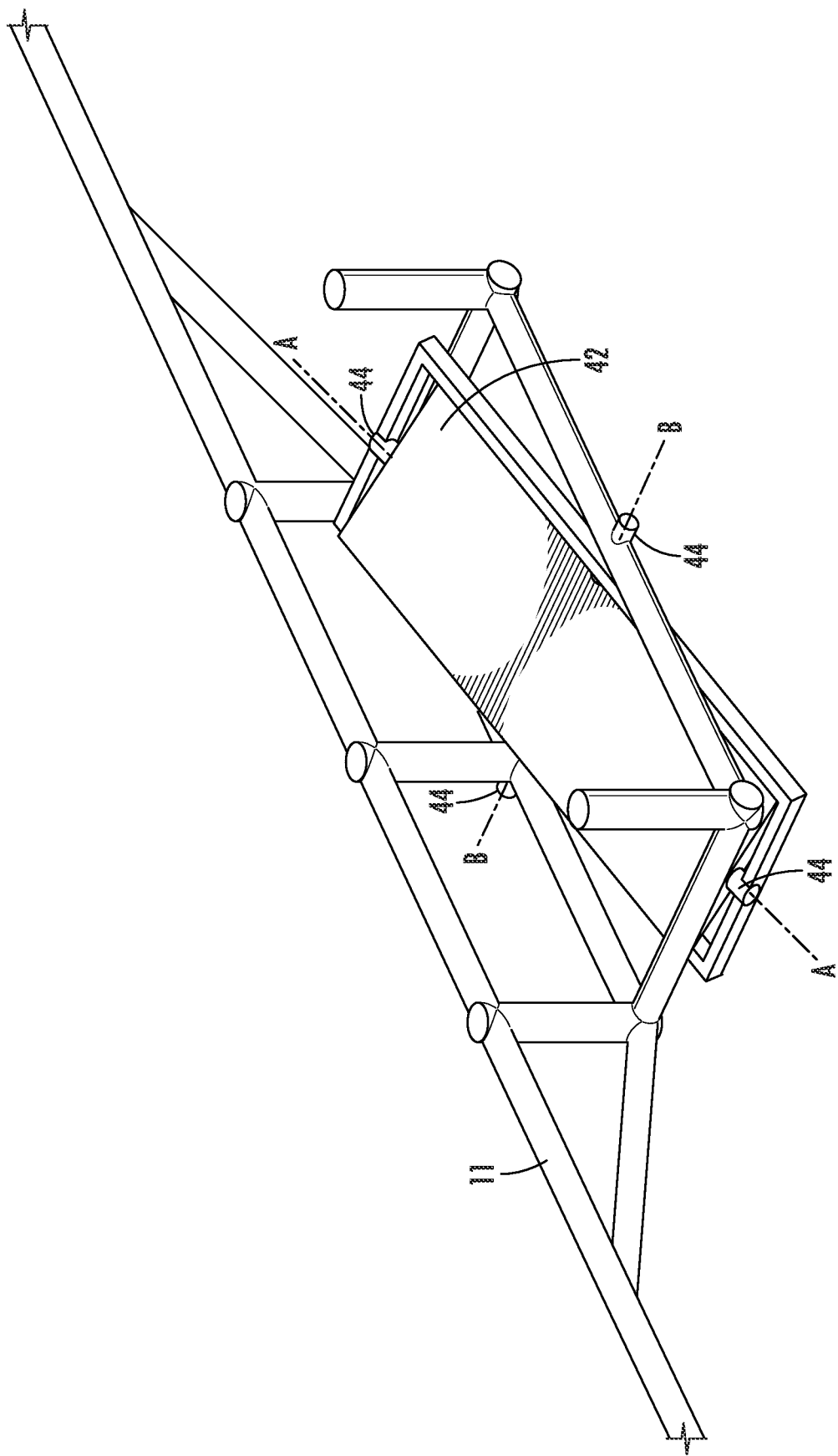

The bottom panel 42 is coupled to the bottom edge of the front panel 40 and is parallel to the frame 11. The bottom panel 42 has a first bottom panel axis of rotation A and a second bottom panel axis of rotation B perpendicular to the first panel axis of rotation A. In some embodiments, the first bottom panel axis of rotation A, or axis A, can be longitudinally along the drone (roll axis) and the second bottom panel axis of rotation B, or axis B, can be along the pitch axis. FIGS. 3B-3D illustrate the bottom panel 42 pivoted in various positions, in accordance with some embodiments. A plurality of motors 44 enable the operation and movement of the bottom panel 42. For example, the bottom panel 42 pivots between a first position and a second position about the first bottom panel axis of rotation A. The bottom panel 42 pivots between a third position and a fourth position about the second bottom panel axis of rotation B.

FIG. 3B shows the bottom panel 42 pivoted to an example second position about the first bottom panel axis of rotation A. FIG. 3C shows the bottom panel 42 pivoted to an example fourth position about the second bottom panel axis of rotation B. FIG. 3D shows the bottom panel 42 pivoted to example positions about their respective axes of rotation A and B. Having the adjustable bottom panel 42 can expand the capabilities of the drone 10 such as for use as a base station.

Referring to FIGS. 1A-1F, a first wing 14 is opposite a second wing 16. The first wing 14 and the second wing 16 are coupled to the center section 34 of the frame 11. The first wing 14 and the second wing 16 extend outwardly from opposite sides of the center section 34 of the frame 11. In some embodiments, the wingspan may be 70-80 feet such as 76.5 feet, the width (e.g., from the front to the back direction of the drone 10) of the first wing 14 and the second wing 16 may be 10 feet, and a length of the first wing 14 may be 34.5 feet. In some embodiments, the length of the first wing 14 is the same as a length of the second wing 16. A plurality of wing braces 26 couple the first wing 14 and the second wing 16 to the fuselage 12 for added rigidity and support of the first wing 14 and the second wing 16.

Figure 4A:
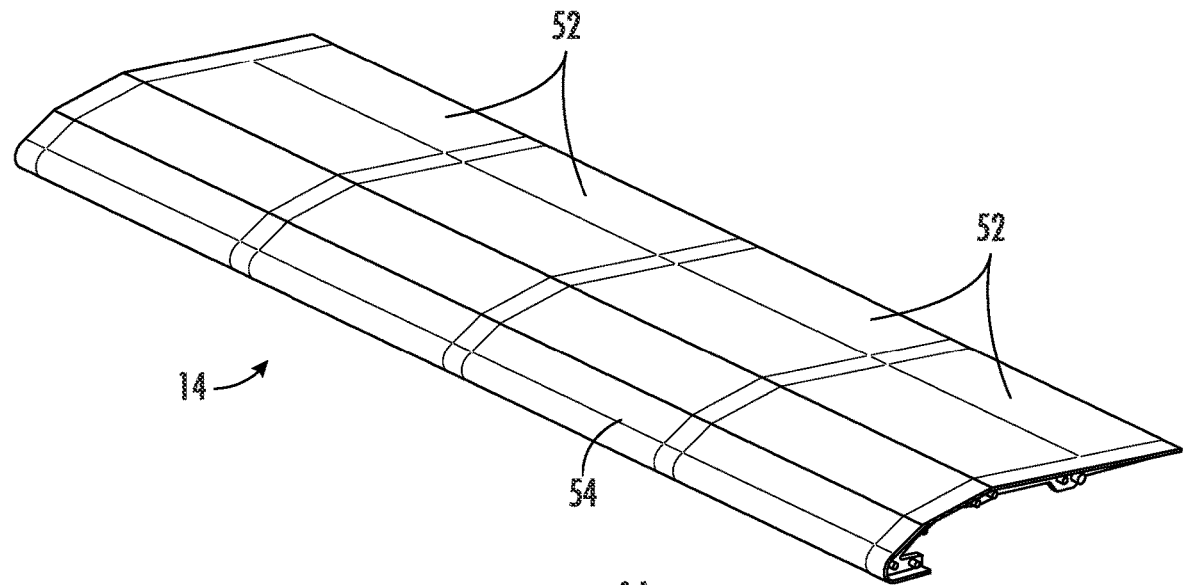
FIG. 4A is a perspective view of a portion of the first wing, in accordance with some embodiments.
Figure 4B:
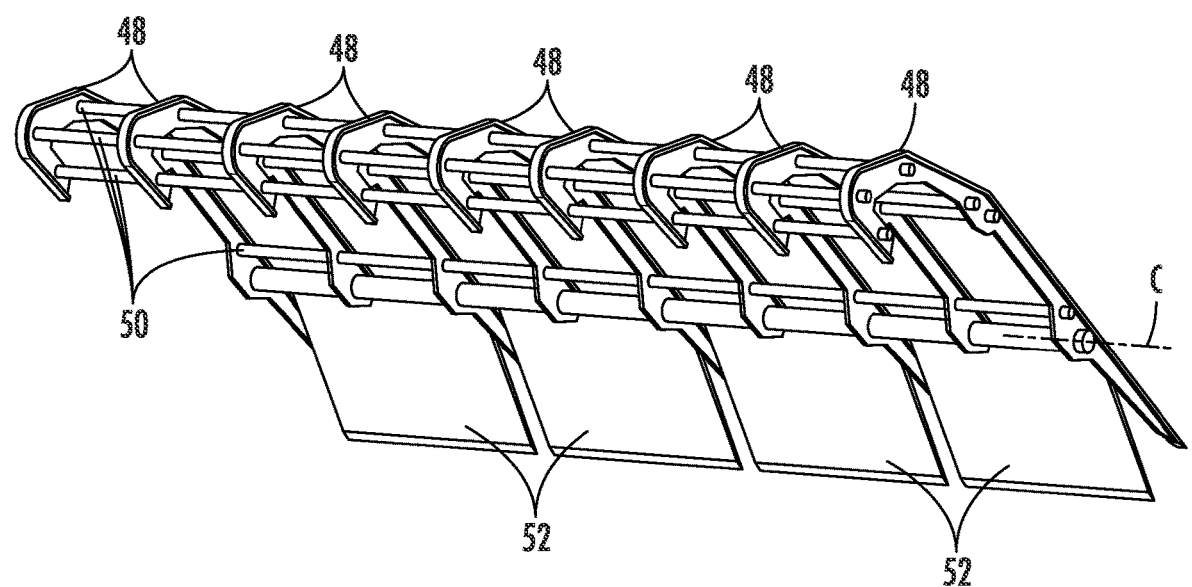
FIG. 4B is a cutaway view of a portion of the first wing, in accordance with some embodiments.

FIG. 4A is a perspective view of a portion of the first wing 14, in accordance with some embodiments, and FIG. 4B is a cutaway view of a portion of the first wing 14, in accordance with some embodiments. The first wing 14 and the second wing 16 are comprised of a frame structure which includes a plurality of structural segments, such as a plurality of wing segments 48 and a plurality of wing rods 50 connected together. The plurality of wing segments 48 form the cross-sectional shape, and the plurality of wing rods 50 connect the plurality of wing segments 48 along the length of the wing. The plurality of wing segments 48 and the plurality of wing rods 50 may be comprised of a carbon fiber. In some embodiments, the plurality of wing segments 48 and the plurality of wing rods 50 may be comprised of aluminum, steel, composite material or combination thereof. Additionally, there are a plurality of pivotable wing extensions 52 positioned across the rear of the first wing 14 and the second wing 16 which may be pivoted about an axis C so that the angle of the plurality of pivotable wing extensions 52 along the wings can adjust the lifting force, or the Coefficient of Lift ($C_L$). For example, the wing extensions 52 can be designed to adjust the $C_L$ between 1.45 and 2.60. The cross-sectional shape of the first wing 14 and the second wing 16 may be an aerodynamic shape such as an airfoil. A wing cover 54, which may be a material similar to or the same as the cover 30, covers the structure of the first wing 14 and the second wing 16.

Referring to FIGS. 1A-1F, the drone 10 includes a rear rudder 28 to enable stability during flight. The drone 10 includes a plurality of legs 46 which may have wheels or feet for landing gear. The plurality of legs 46 support the drone 10 when it is not flying, and allows the drone 10 to take off, land, and taxi without damage. The drone 10 includes a plurality of fuel tanks 56. The plurality of fuel tanks 56 may be comprised of a flexible and foldable material and arranged to supply fuel to the plurality of power generator systems 22. The plurality of fuel tanks 56 comprised of a material as opposed to a metal or composite, reduces the weight of the fuel tank 56. In some embodiments, a housing may enclose each fuel tank 56.

As described, the drone 10 is comprised of carbon fiber which is known to be strong and lightweight, having a high strength-to-weight ratio. This enables the drone 10 to be lightweight but carry a large amount of payload, such as fuel. For example, in an example embodiment, the drone 10 may consume two gallons of fuel an hour for 24 hours over 10 days. This would add 1,305.6 kg of weight in fuel and allow the drone 10 to be airborne for 10 days without needing to refuel.

Referring to FIGS. 1A and 1E, a first mounting member 18 is coupled to the front section 32 of the frame 11 and extends outwardly from opposite sides of the front section 32 of the frame 11. A second mounting member 20 is coupled to the rear section 36 of the frame 11 and extends outwardly from opposite sides of the rear section 36 of the frame 11. The first mounting member 18 and the second mounting member 20 are coupled to the frame 11 on a top surface of the frame 11. The first mounting member 18 and the second mounting member 20 each include a mounting rod 140 and brackets 142. The mounting rod 140 is positioned perpendicular to the length of the frame 11, and the brackets 142, such as two brackets 142, are coupled to the top surface of the frame 11 to secure the mounting rod 140. The first mounting member 18 and the second mounting member 20 secure the plurality of power generator systems 22 in position.

The drone 10 includes a plurality of power generator systems 22. Each power generator system 22 is coupled to the first mounting member 18 or the second mounting member 20. For example, there may be two power generator systems 22 coupled to the first mounting member 18 with one power generator system 22 on each side of the frame 11. Likewise, there may be two power generator systems 22 coupled to the second mounting member 20 with one power generator system 22 on each side of the frame 11. The power generator systems 22 are located near the frame 11 or fuselage 12 as opposed to near the end of the first wing 14 or second wing 16 as in a conventional drone or aircraft. For example, the gap between the closest power generator system 22 and the frame 11 may be 46-55 inches or in some embodiments, 46.25 inches. Positioning the power generator systems 22 closer to the center of gravity as opposed to at the end of the wings, and having a symmetrical configuration of the power generator systems 22 between the first side of the frame 11 and the second side of the frame 11, provides better stability in the maneuverability of the drone 10 during take-off, in-flight and landing.

The total amount of power generator systems 22 may be four. In other embodiments, there may be any number of power generator system 22 mounted on first side of the frame 11 or the second side of the frame 11. For example, there may be 2-6 power generator systems 22 mounted to the first mounting member 18, with an equal number on each side of the frame 11, and 2-6 power generator systems 22 mounted to the second mounting member 20, with an equal number on each side of the frame 11, for a total of 4-12 power generator systems 22. In other embodiments, there may be more or less power generator systems 22 mounted to the first mounting member 18 than the second mounting member 20.

Figure 5A:
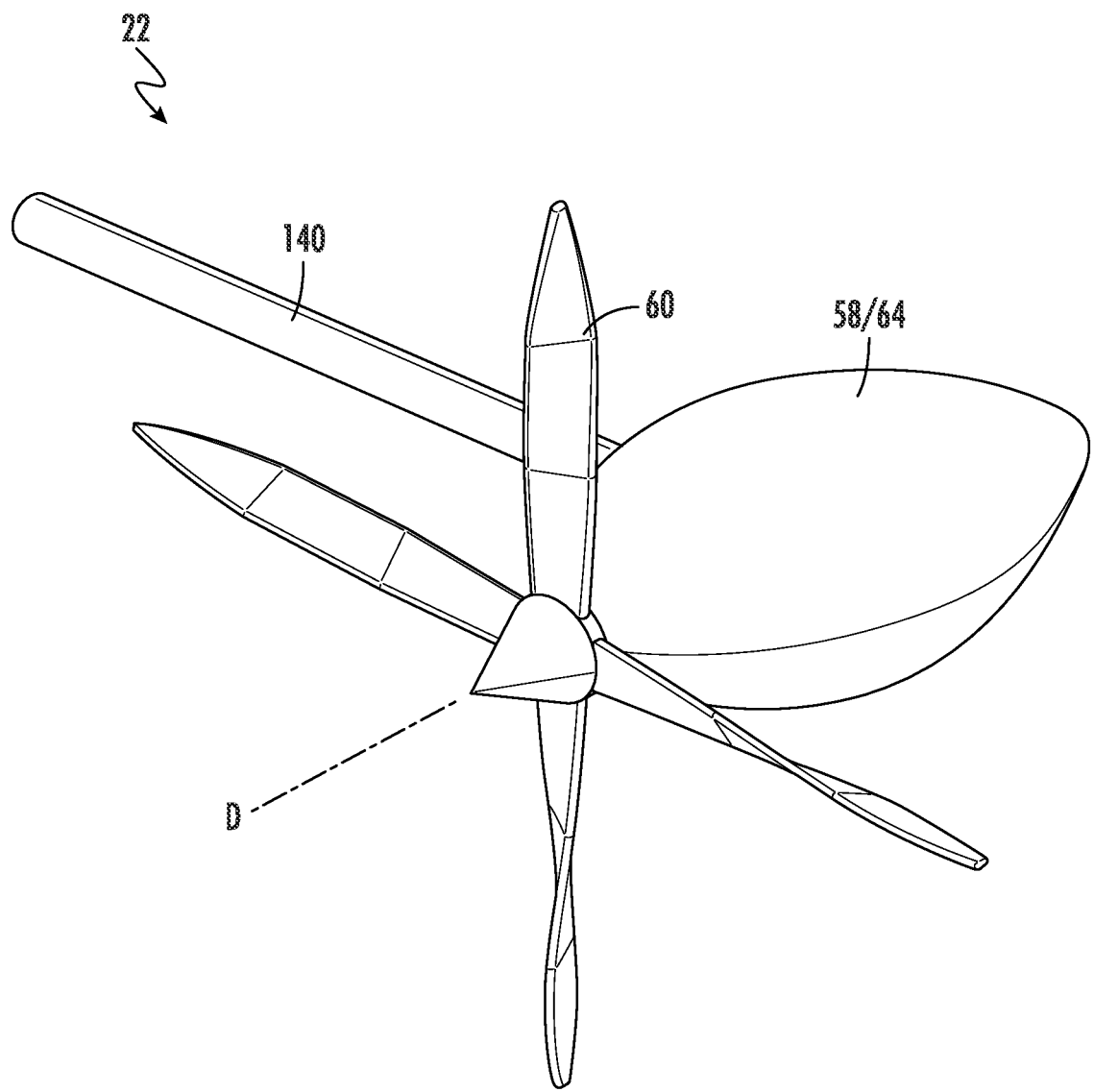
FIG. 5A is a perspective view of the power generator system, in accordance with some embodiments.
Figure 5C:
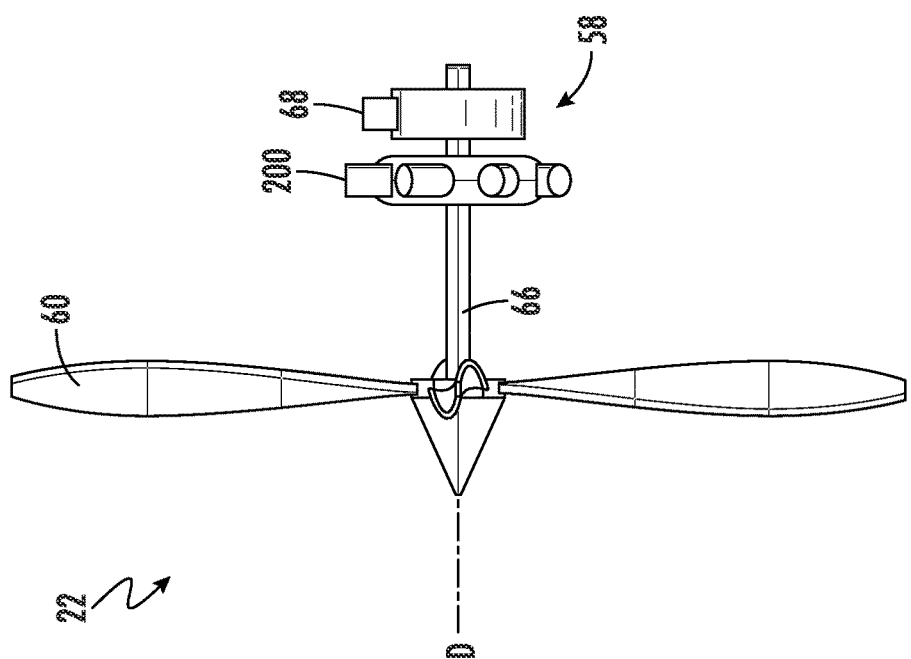
FIG. 5C is a side view of the power generator system with a housing removed, in accordance with some embodiments.
Figure 5B:
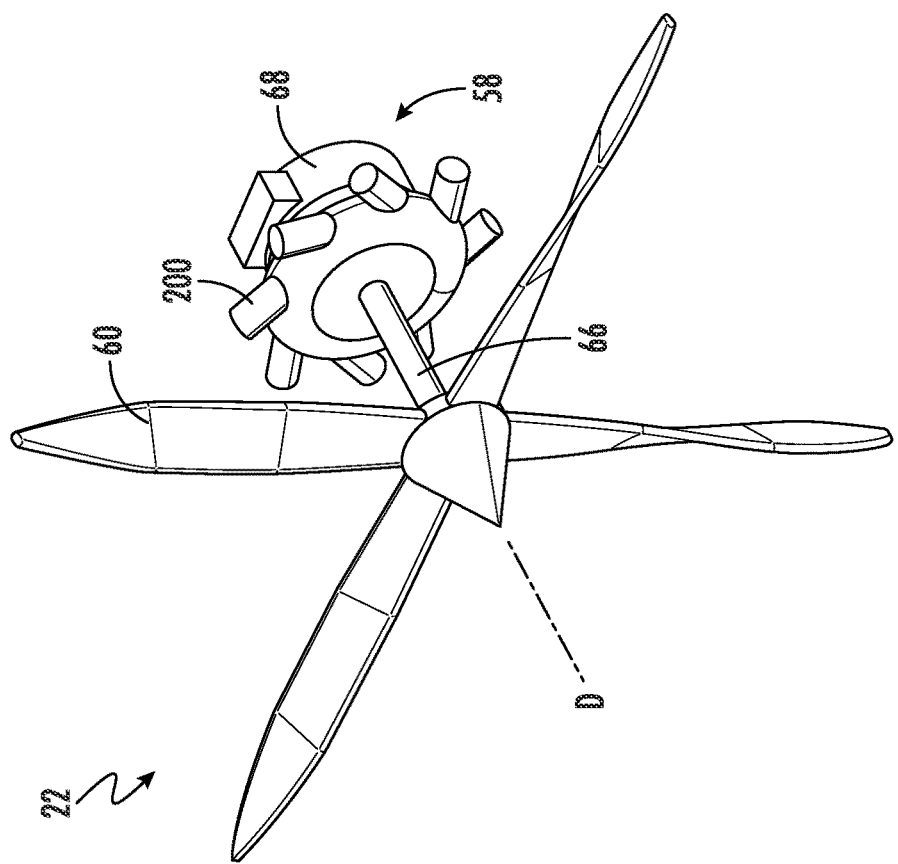
FIG. 5B is a perspective view of the power generator system with a housing removed, in accordance with some embodiments.

In accordance with some embodiments, FIG. 5A is a perspective view of the power generator system 22, FIG. 5B is a perspective view of the power generator system 22 with the a housing 64 removed, and FIG. 5C is a side view of the power generator system 22 with the a housing 64 removed. Each power generator system 22 includes a power source 58, a propeller 60, and a housing 64. The housing 64 covers the power source 58 and in some embodiments, may have a diameter of 22-30 inches, such as 26 inches, and an overall length of 60-70 inches, such as 65 inches. The housing 64 may have an oblong, aerodynamic shape such as a football-like shape.

A propeller shaft 66 couples the power source 58 to the propeller 60 and drives the propeller 60. For example, the propeller shaft 66 is configured to transfer torque and rotation from the power source 58 to the propeller 60 in a first direction such as a clockwise direction. The propeller 60 has an axis of rotation D so that the propeller 60 rotates about axis D. The propeller 60 is comprised of a plurality of blades and each blade may have a curved profile such as each blade with pitch of 25 inches. In some embodiments, the number of blades of the propeller 60 is two, three, four, five or six. In some embodiments, a diameter of the propeller 60 may be 85-98 inches such as 92.5 inches.

Figure 5D:
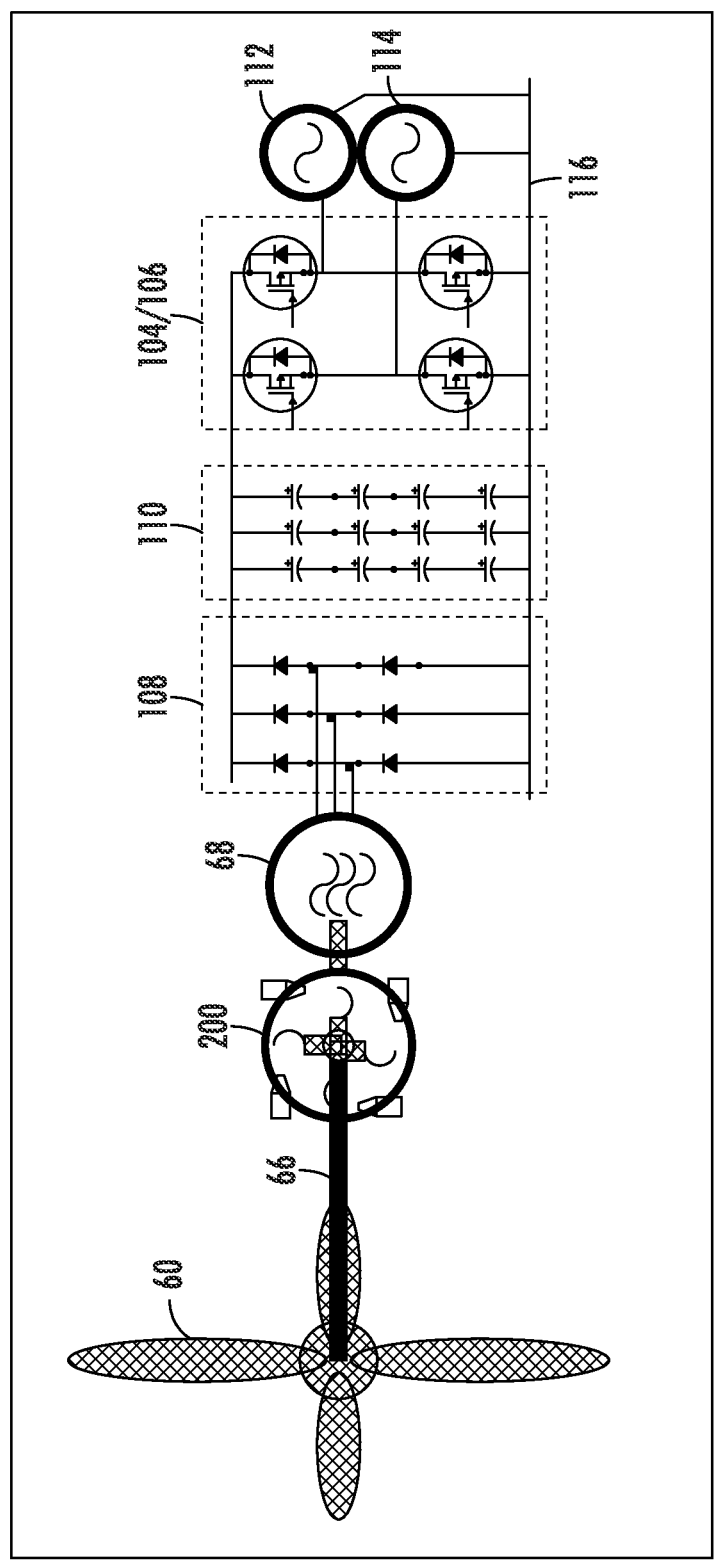
FIG. 5D is an electric power schematic for drone, in accordance with some embodiments.

Each power generator system 22 includes at least one power source 58. The power source 58 may be any type of engine or motor such as a gas engine, diesel engine, battery-powered engine, axial flux motor 68, turbine engine system 200 or combination thereof. For example, the axial flux motor 68 of the power source 58, as shown in FIGS. 5B and 5C, provides the electrical power for the drone 10. FIG. 5D is an electric power schematic for drone 10, in accordance with some embodiments. For example, the axial flux motor 68 is coupled to the turbine engine system 200. The axial flux motor 68 and the turbine engine system 200 generate an electrical signal (e.g., 720V DC) to control the operation of the drone 10 such as for wireless communications, warning lights for safety, the electro-optical/infrared (EO/IR) system 90 (see FIG. 17) and the like. Various components such as insulated-gate bipolar transistors (IGBT) 104, DC-AC inverters 106 and AC-DC rectifiers 108 may be used to modify the electrical signal for multiple AC sources 112 for use by the drone 10. A battery bank 110 such as a lithium-iron may be included. A ground wire is labelled as 116.

Figure 5E:
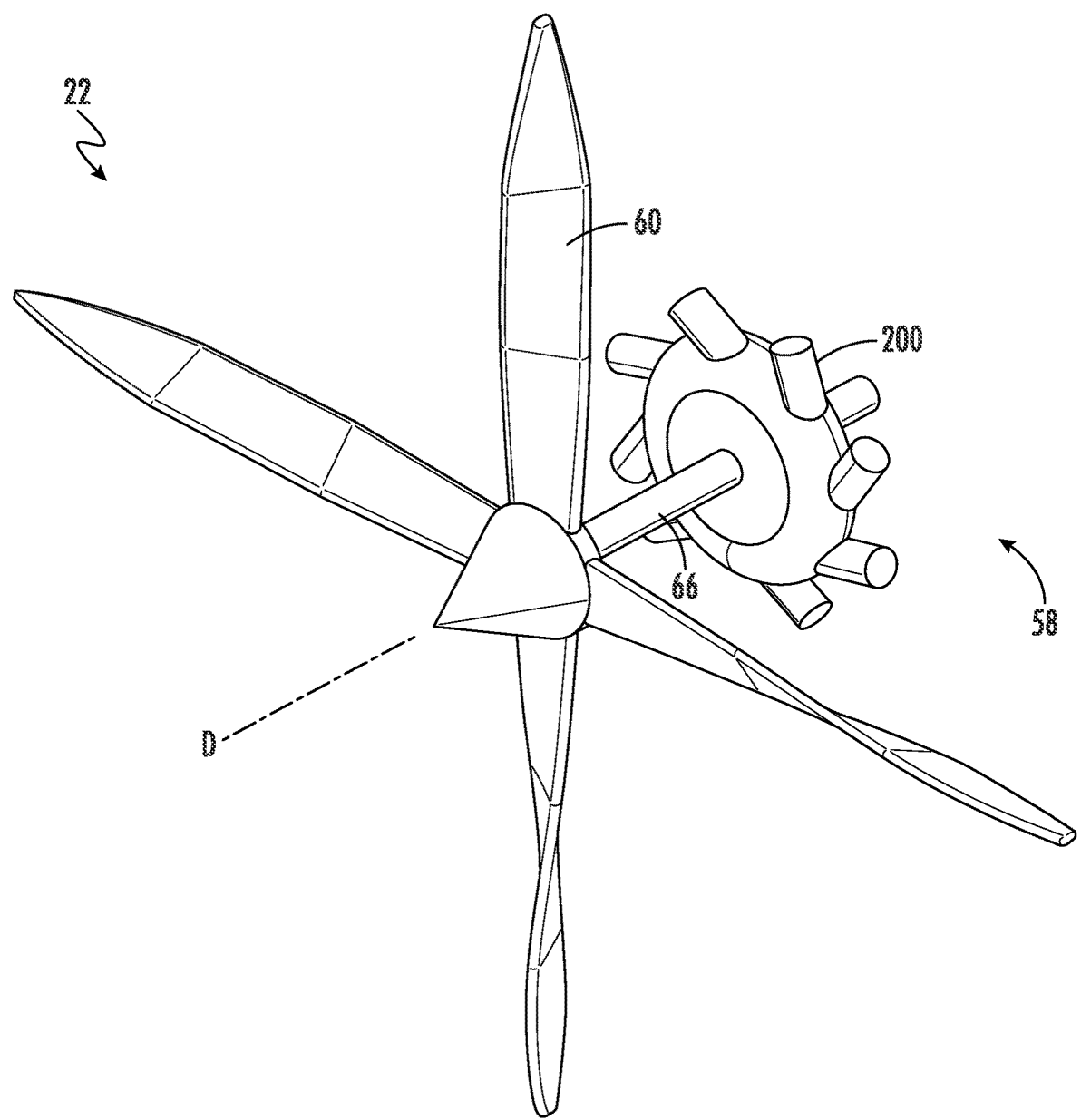
FIG. 5E is a perspective view of the power generator system with the a housing removed and the turbine engine system as the power source, in accordance with some embodiments.

In some embodiments, only one of the plurality of power generator systems 22 includes the axial flux motor 68. The one axial flux motor 68 is coupled to the plurality of power generator systems 22 and generates all of the necessary power for the drone 10. In this way, only one axial flux motor 68 is needed for the drone 10 which decreases the amount of components, cost and weight of the drone 10. FIG. 5E is a perspective view of the power generator system 22 with the a housing 64 removed and the turbine engine system 200 as the power source 58, in accordance with some embodiments.

Figure 6:
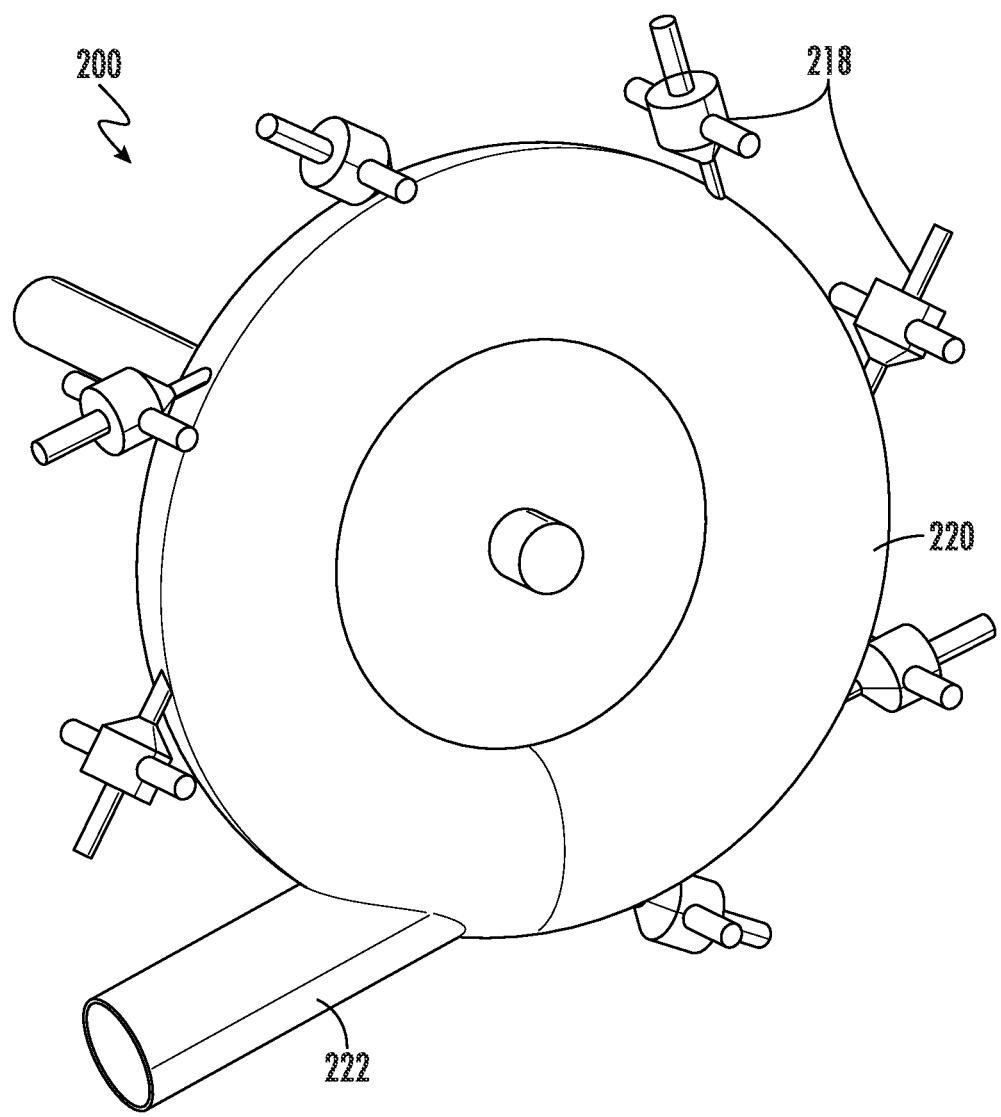
FIG. 6 is a perspective view of a turbine engine system, in accordance with some embodiments.

A turbine engine system is disclosed in Jeng, U.S. patent application Ser. No. 17/067,143, entitled "Turbine Engine System" filed on Oct. 9, 2020, which is owned by the assignee of the present application and is hereby incorporated by reference. FIG. 6 is a perspective view of a turbine engine system 200, in accordance with some embodiments, and as disclosed in U.S. patent application Ser. No. 17/067,143. In some embodiments, the power source 58 is a combination of the axial flux motor 68 and the turbine engine system 200. The turbine engine system 200 is shown with an enclosure 220, plurality of dispensers 218 and an exhaust pipe 222.

Figure 7A:
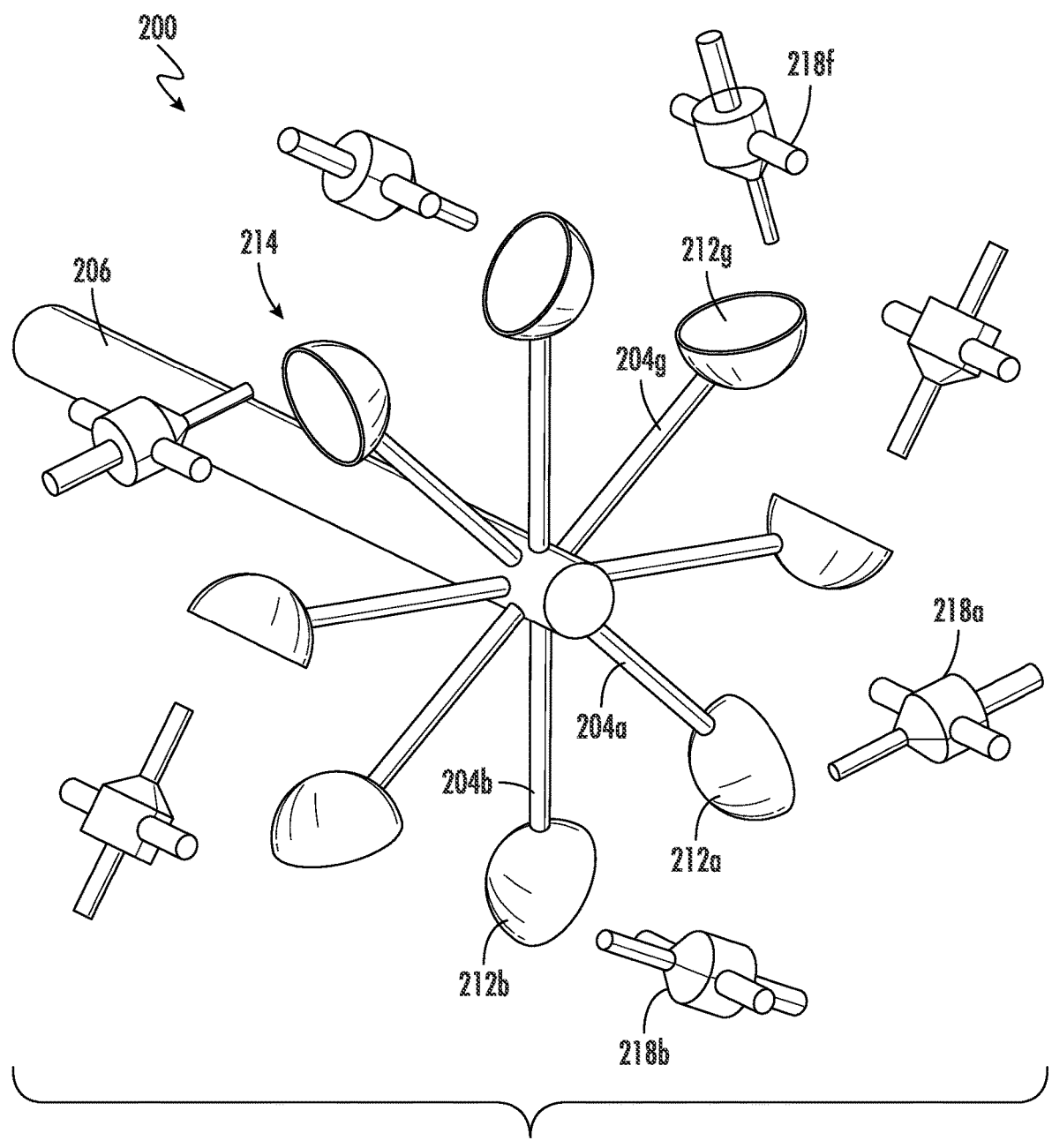
FIG. 7A is a perspective view of the turbine engine system with the enclosure removed, in accordance with some embodiments.

FIG. 7A is a perspective view of the turbine engine system 200 with the enclosure 220 removed, in accordance with some embodiments. The turbine engine system 200 has a plurality of spokes 204. Each of the plurality of spokes 204 may be designated as 204a, 204b, 204c . . . 204n. As shown, there are eight spokes 204 which is considered an 8-blade turbine design. The plurality of spokes 204 are spaced circumferentially around a turbine shaft 206. The spacing of each of the plurality of spokes 204 may be evenly spaced, or spaced in a pattern such as spaced in pairs with more distance in between the pairs, or randomly spaced, or the like. Each of the plurality of spokes 204 has a first spoke end 208 and a second spoke end 210, and the spoke 204 extends along an axis between the first spoke end 208 and the second spoke end 210. The first spoke end 208 is coupled to the turbine shaft 206 and the second spoke end 210 is coupled to a blade 212 of a plurality of blades 212. Each of the plurality of blades 212 may be designated as 212a, 212b, 212c . . . 212n. Each of the plurality of blades 212 has a receiving face with an open surface such as a hollowed-out receptacle to catch and receive fluid. In some embodiments, each of the plurality of blades 212 is a hemispherical-shaped cup with an open surface. Other shapes are possible such as oval or elliptical. The shape of each of the plurality of blades 212 is designed to maximize the amount of fluid collected while considering drag coefficient in fluid dynamic theory. For example, the hemispherical-shaped cup blade 212 may have a drag coefficient of 0.42 and a blade 212 with an elliptical shape may have a drag coefficient of 0.04. The depth of the hemispherical-shaped cup with an open surface may be completely hollowed-out or may not be hollowed-out but only slightly concaved. The plurality of spokes 204 and the plurality of blades 212 are configured to rotate about the turbine shaft 206 forming a turbine 214.

A plurality of dispensers 218 are mounted to the enclosure 220 and spaced circumferentially around the turbine shaft 206. The spacing of each of the plurality of dispensers 218 may be evenly spaced, or spaced in a pattern such as spaced in pairs with more distance in between the pairs, or randomly spaced, or the like. Generally, the spacing of each of the plurality of dispensers 218 coordinates with the spacing of each of the plurality of spokes 204. Each of the plurality of dispensers 218 may be designated as 218a, 218b, 218c . . . 218n. Each of the plurality of dispensers 218 is configured to deliver fluid (e.g., liquid or gas) to each of the plurality of blades 212. Each of the plurality of dispensers 218 is generally positioned facing the open surface of each of the plurality of blades 212, and configured to direct discharged fluid toward the open surface of each of the plurality of blades 212 to drive or move the turbine 214.

Referring to FIG. 6, the enclosure 220 encloses a portion of each of the plurality of dispensers 218, the plurality of blades 212, the plurality of spokes 204 and a portion of the turbine shaft 206. In some embodiments, the enclosure 220 encloses all of the plurality of dispensers 218, the plurality of blades 212, the plurality of spokes 204 and a portion of the turbine shaft 206. In this way, all of the plurality of dispensers 218 are located inside of the enclosure 220. The enclosure 220 may be circular or toroidal or another suitable shape. In some embodiments, liquid coolant conduits (not shown) are coupled to the inside surface of the enclosure 220 and configured to dissipate heat in the discharged fluid after combustion in the combustion chamber 224 of each of the plurality of dispensers 218. An exhaust pipe 222 may be coupled to or integral with the enclosure 220, and may extend away from the turbine shaft 206. The exhaust pipe 222 is configured to direct the discharged fluid out of the enclosure 220.

Figure 7B:
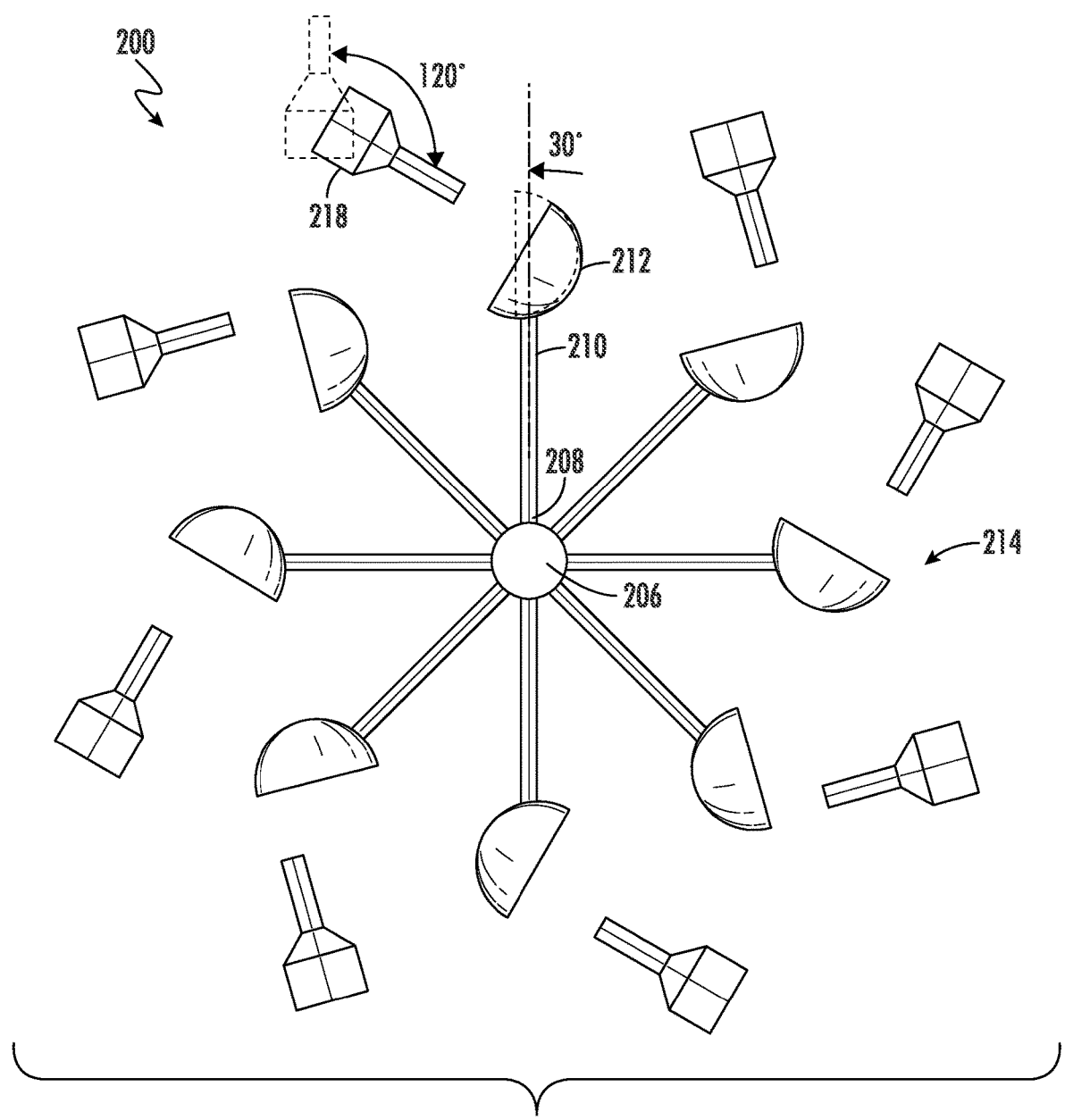
FIG. 7B is a front view of a plurality of spokes of the turbine engine system, in accordance with some embodiments.

FIG. 7B is a front view of a plurality of spokes 204 of the turbine engine system 200, in accordance with some embodiments. Each of the plurality of blades 212 is coupled to the second spoke end 210 of each of the plurality of spokes 204 with the open surface at an angle to the axis (along the spoke 204, see dashed line). FIG. 7B shows each of the plurality of blades 212 at a 30° angle to each of the plurality of spokes 204. In this way, each of the plurality of blades 212 is apt to maximize the amount of fluid such as combusted gas received from each of the plurality of dispensers 218 depending on the application. In other embodiments, each of the plurality of blades 212 is at an angle to the spoke of −20° to 75° such as −15°, 0°, 15°, 20°, 30°, 40° or 60°. In some embodiments, each of the plurality of dispensers 218 may be positioned at a 120° angle to each of the plurality of spokes 204. The centerline of each of the plurality of dispensers 218 may be perpendicular to a portion of each of the plurality of blades 212 such as the receiving face of the open surface of the cup of each of the plurality of blades 212. The position of each of the plurality of dispensers 218 is designed to maximize the amount of fluid collected by each of the plurality of blades 212.

Figure 7C:
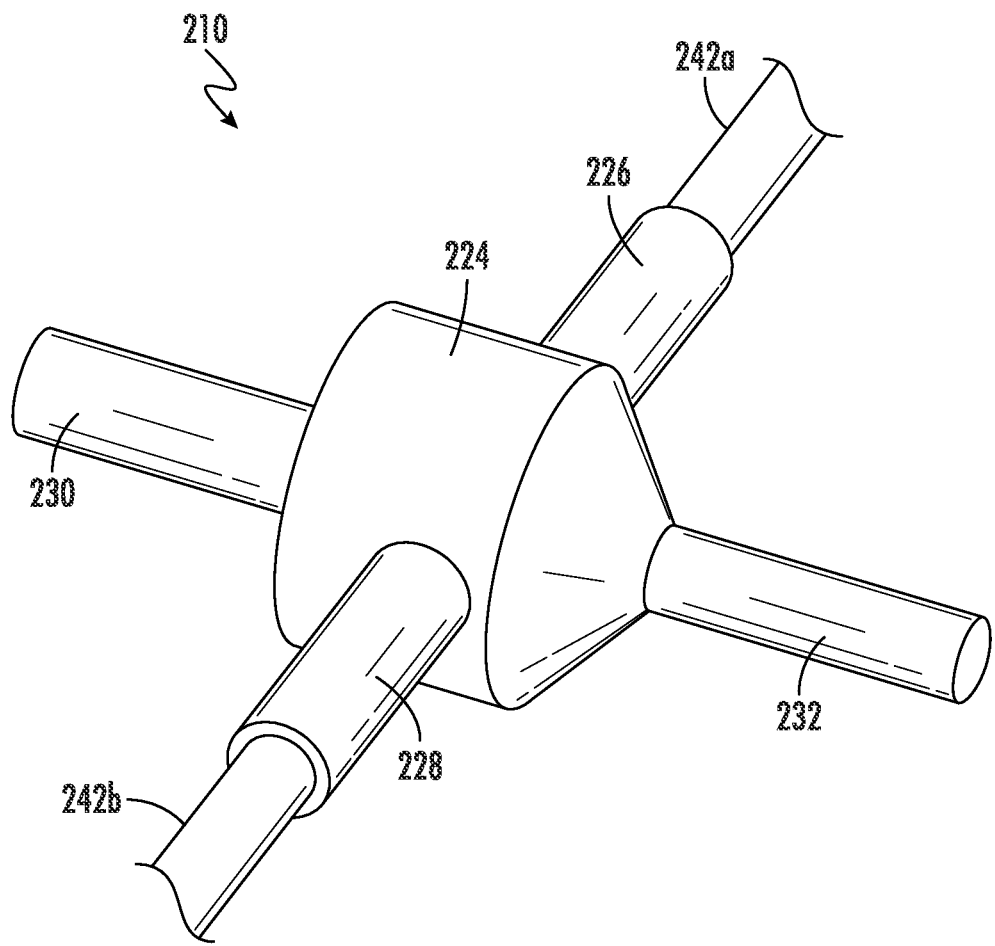
FIG. 7C is a perspective view of the dispenser of the turbine engine system, in accordance with some embodiments.

FIG. 7C is a perspective view of the dispenser 218 of the turbine engine system 200, in accordance with some embodiments. The design of the plurality of dispensers 218 is based on rocket combustion design technology. Conventionally, a piston engine only harvests the initial energy per ignition because when the piston stroke reaches the end, no more energy can be used to turn the shaft. Thus, a large percentage of the energy is lost in the impact of the stroke. Conversely, the turbine engine system 200 can harvest nearly 100% of the gas expansion energy because the turbine 214 is in continuous rotation. Each of the plurality of dispensers 218 includes a combustion chamber 224 which may be a conical shape with a first, wider-shaped end and a second, narrower-shaped end such as a funnel. Other shapes are possible. An air injector 226 is coupled to the combustion chamber 224 and configured to inject air of an air-fuel mixture into the combustion chamber 224. A fuel injector 228 is coupled to the combustion chamber 224 and configured to inject fuel of the air-fuel mixture into the combustion chamber 224. An ignitor 230 such as a spark plug is coupled to the combustion chamber 224 and configured to supply an electrical spark for combustion of the air-fuel mixture in the combustion chamber 224. A nozzle 232 has a first nozzle end coupled to the combustion chamber 224 and a second nozzle end positioned to direct the discharged fluid after combustion in the combustion chamber 224 toward the open surface of the blade 212 to move the turbine engine system 200. The shape of the nozzle 232 may be linear as shown in FIG. 7C, or curved. The fuel injector 228 of the dispenser 218 injects the fuel into the combustion chamber 224 via hose 242b, and the air injector 226 of the dispenser 218 injects the air into the combustion chamber 224 via hose 242a.

In some embodiments, the fuel is gasoline or liquified natural gas. In the present embodiments, the nozzle 232 coupled to the combustion chamber 224 directs the hot air—or discharged fluid 13 after combustion in the combustion chamber 224 toward the open surface of each of the plurality of blades 212 to drive the turbine 214 of the turbine engine system 200. The discharged fluid exits the combustion chamber 224 at a high speed similar to a fire engine dispensing high-pressure water. The discharged fluid contacts and pushes or moves each of the plurality of blades 212 of the turbine 214 and causes each of the plurality of blades 212 to rotate about the turbine shaft 206.

Figure 8:
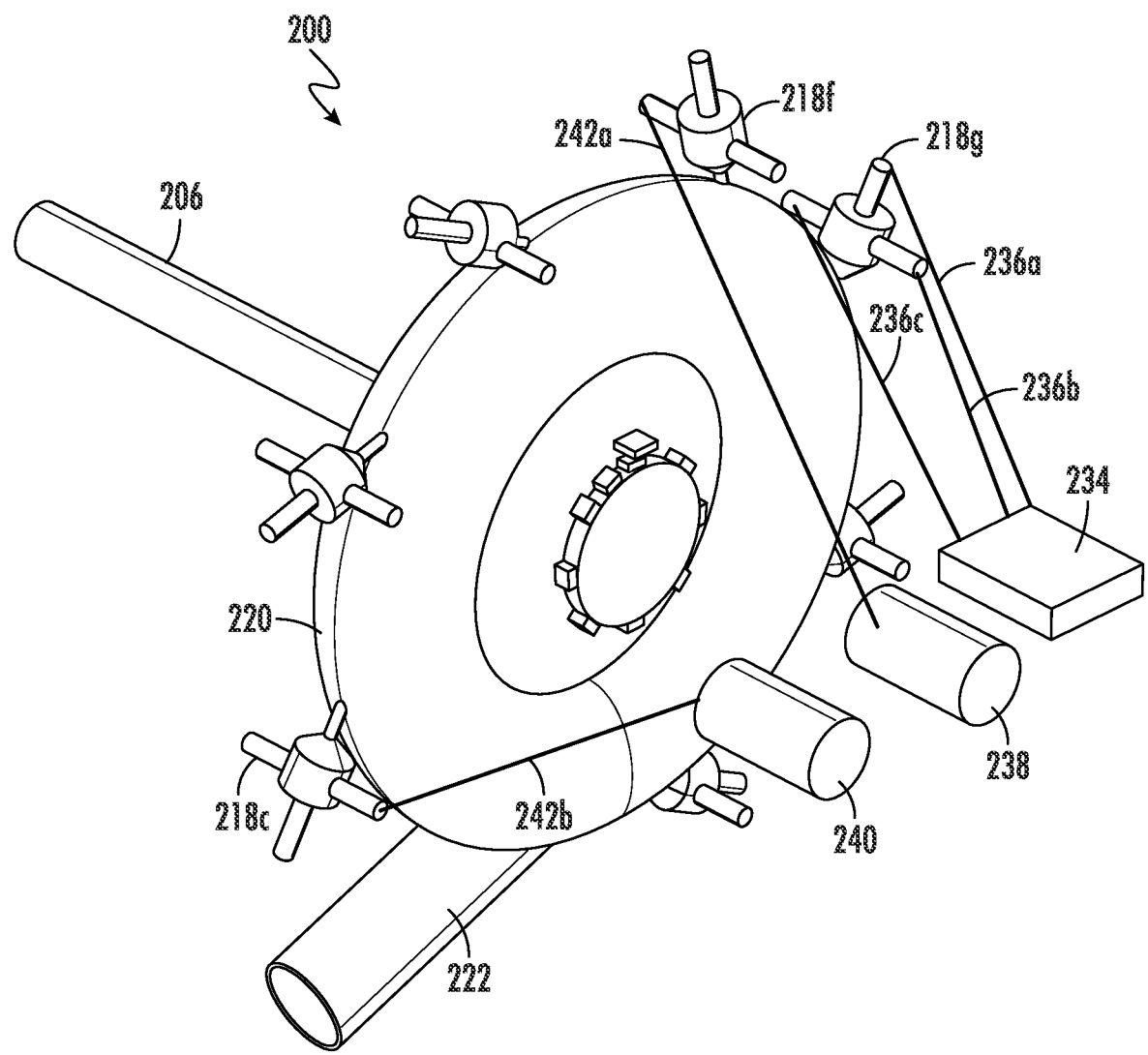
FIG. 8 is a perspective view of the turbine engine system, in accordance with some embodiments.

FIG. 8 is a perspective view of the turbine engine system 200, in accordance with some embodiments. A controller 234 is in communication with the plurality of dispensers 218 and configured to control at least the air injector 226, the fuel injector 228 and the ignitor 230 of each of the plurality of dispensers 218. In some embodiments, the controller 234 is in communication with the valve 245 and configured to control the valve 245. The controller 234 may be coupled to the air injector 226 and the fuel injector 228 to control the opening and closing of an internal air valve in each air injector 226 and an internal fuel valve in each fuel injector 228. The controller 234 may also be coupled to the ignitor 230 with wires to control the ignition in each of the plurality of dispensers 218. For simplicity, in FIG. 8, the wires are shown as 236a, 236b and 236c from the controller 234 to only one of the dispensers 218 such as 218g. An air compressor 238 and a fuel pump 240 are coupled to each of the plurality of dispensers 218 respectively by, for example, hoses 242a and 242b. The hoses, 242a and 242b, are shown to only one of the dispensers 218 such as 218f and 218b.

Figure 9:
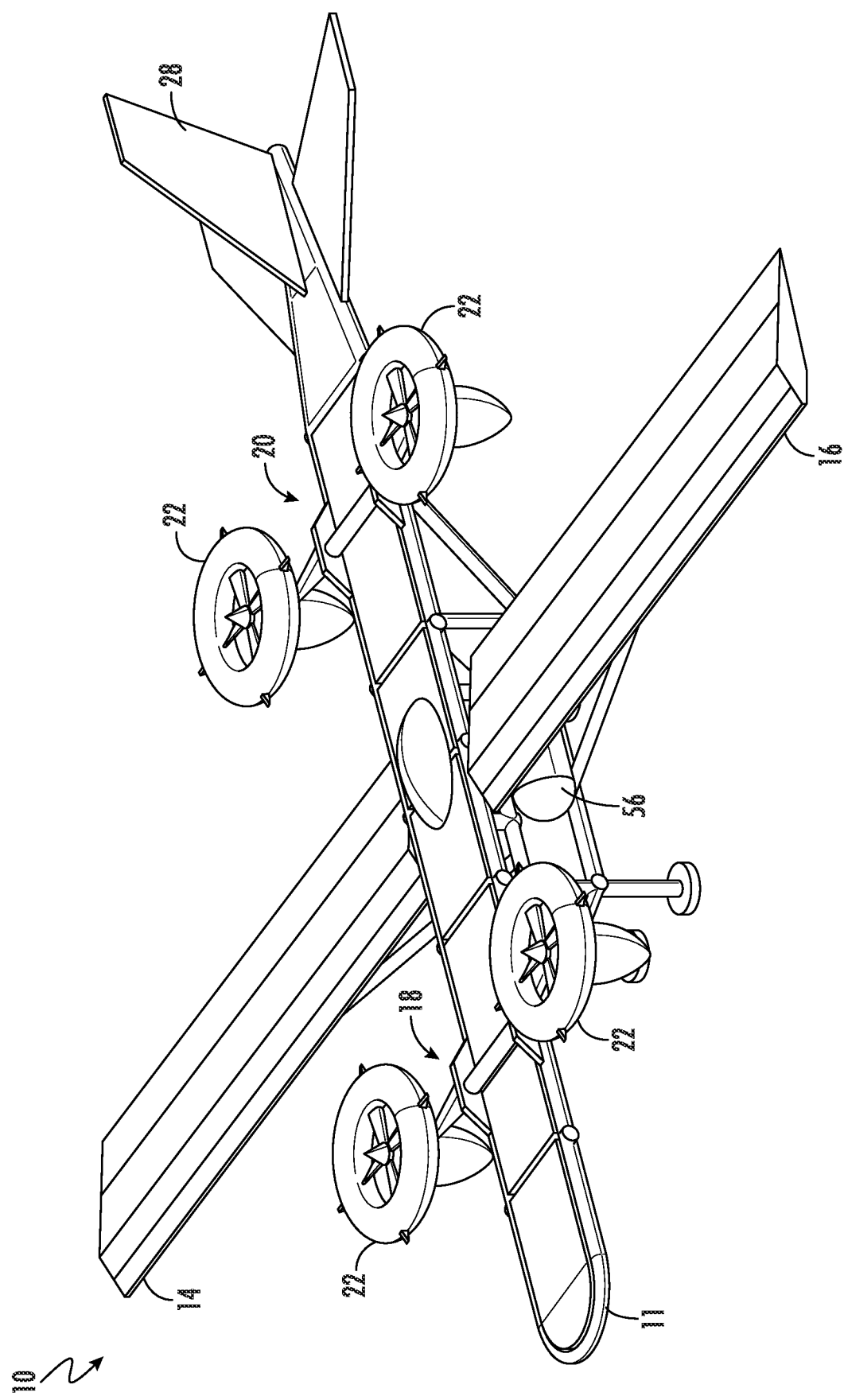
FIG. 9 is a perspective view of the drone, in accordance with some embodiments.

Each power generator system 22 is controlled independently from one another. For each power generator system 22, the propeller 60 is pivotable between a first orientation and a second orientation, and the second orientation is perpendicular to the first orientation. For example, the first orientation may have a first orientation axis of rotation approximately horizontal, and the second orientation may have a second orientation axis of rotation approximately vertical. In this way, the first orientation may be a 0° horizontal orientation and the second orientation may be a 90° vertical orientation. Referring to FIGS. 1A-1F, the propeller 60 is illustrated in a first orientation such as 0° horizontal orientation. FIG. 9 is a perspective view of the drone 10, in accordance with some embodiments. FIG. 9 shows the drone 10 with the propeller 60 of each power generator system 22 in the second orientation where the second orientation is perpendicular to the first orientation such as at 90°. This configuration may be used during a vertical take-off or landing. This adjustability in orientation of the power generator systems 22 enables a high amount of maneuverability of the drone in roll, pitch and yaw directions while enabling vertical take-off and landing.

Figure 10:
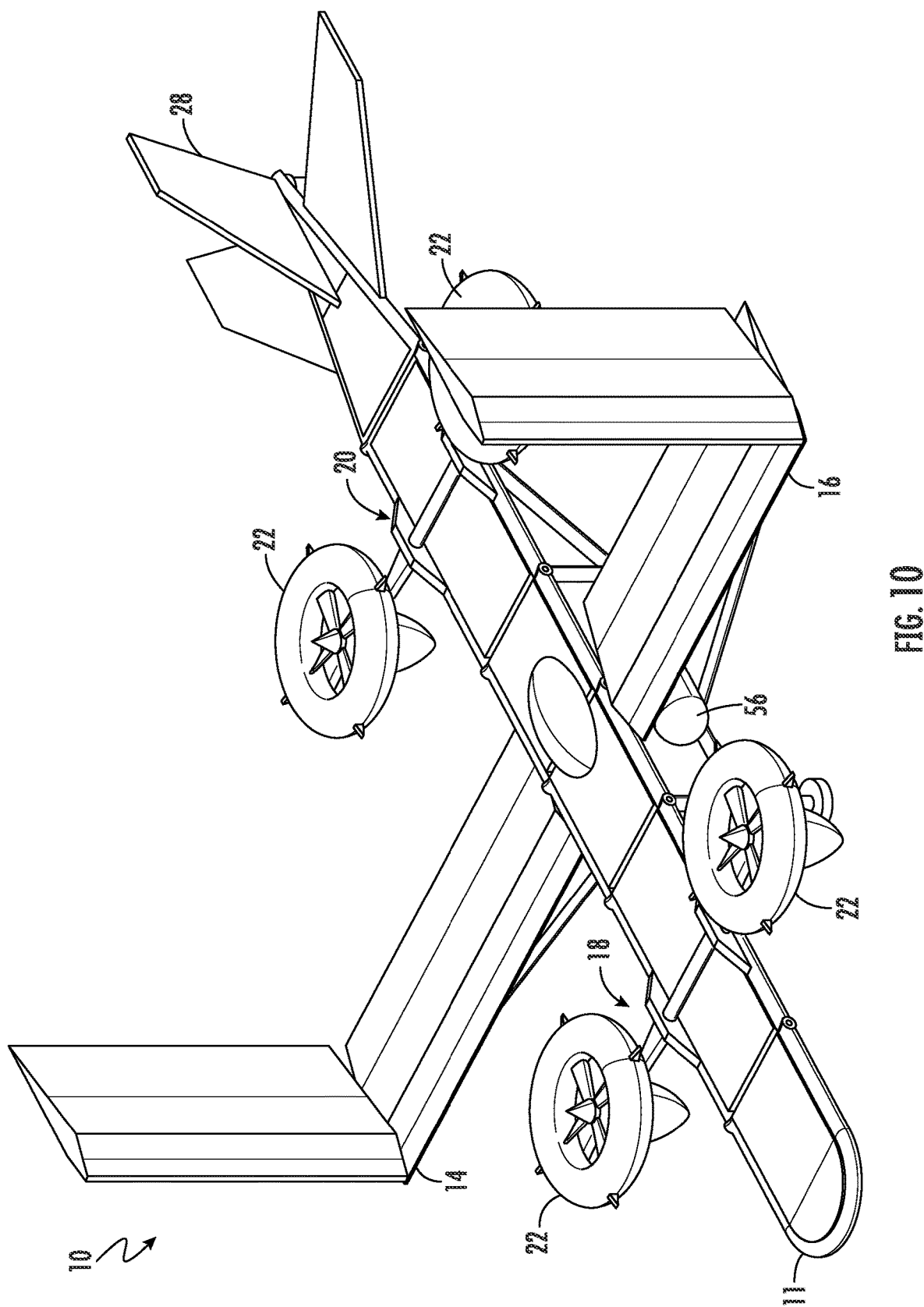
FIG. 10 is a perspective view of the drone, in accordance with some embodiments.

FIG. 10 is a perspective view of the drone 10, in accordance with some embodiments. In some embodiments, the first wing 14 and the second wing 16 may be folded along its length in an upward direction. This may be useful for take-off or landing of the drone 10 when space is limited, and can enable a smaller space for storing the drone 10.

FIG. 11A shows a formula for calculating thrust, where the thrust force is F, the diameter of each propeller is p, the speed of the engine is RPM, and the pitch of the blade of the propeller is pitch. FIG. 11B shows Table 11B of sample parameters for the propeller 60, in accordance with some embodiments. For example, the propeller 60 has a diameter of 92.5 inches, a pitch of the blades of 25 inches and the engine speed of 4000 rpms. FIG. 11C shows Table 11C of the results for calculations, in accordance with some embodiments. For example, the results for the static thrust and the dynamic thrust of the drone 10 at various speeds in various units are listed. The results in Table 11C are based on the formula in FIG. 11A and the parameters of the propeller 60 in FIG. 11B. The static thrust of the drone 10 is 1,154.25 kg.

Figure 12A:
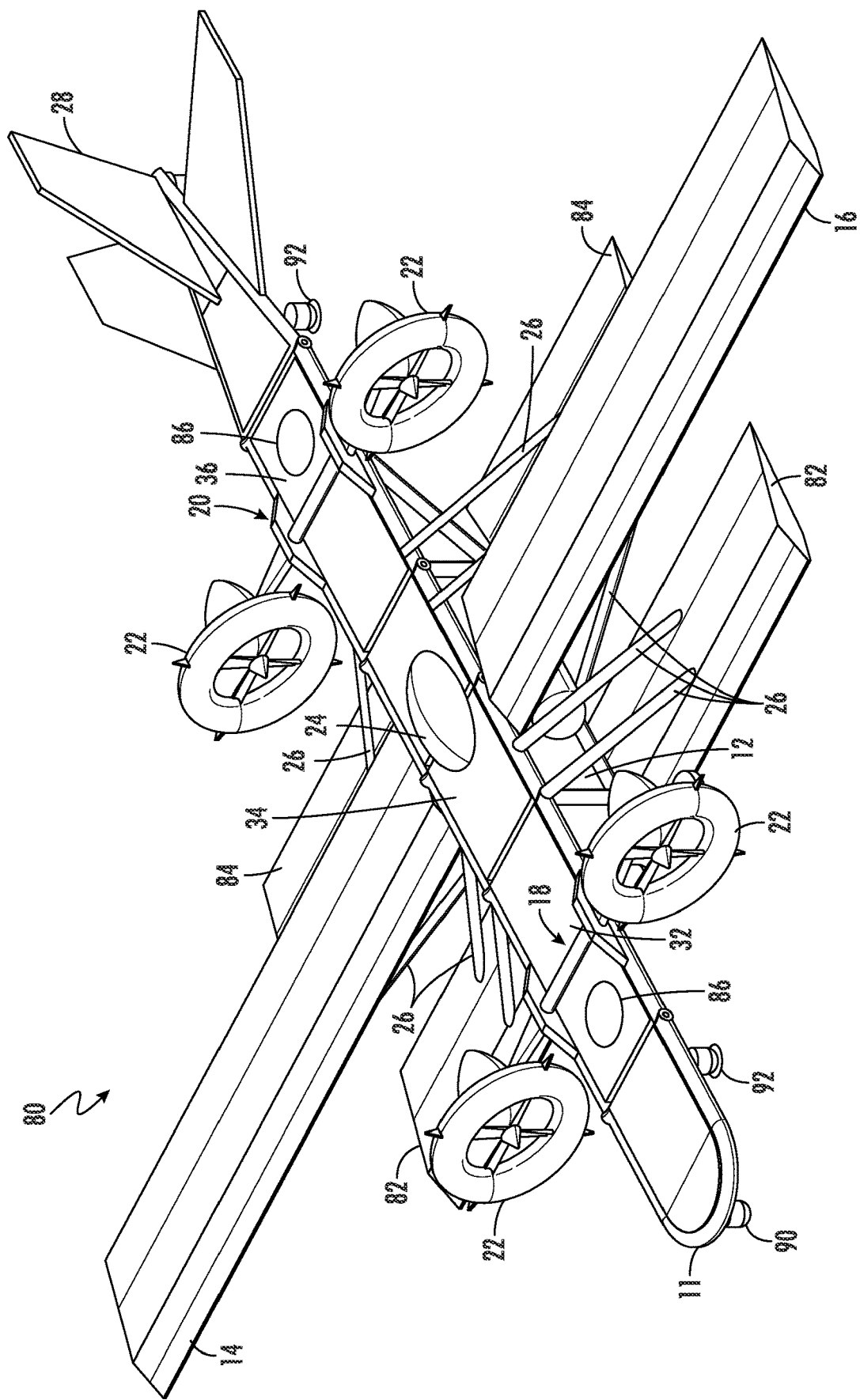
FIGS. 12A and 12B are perspective views of a drone, in accordance with some embodiments.
Figure 12B:
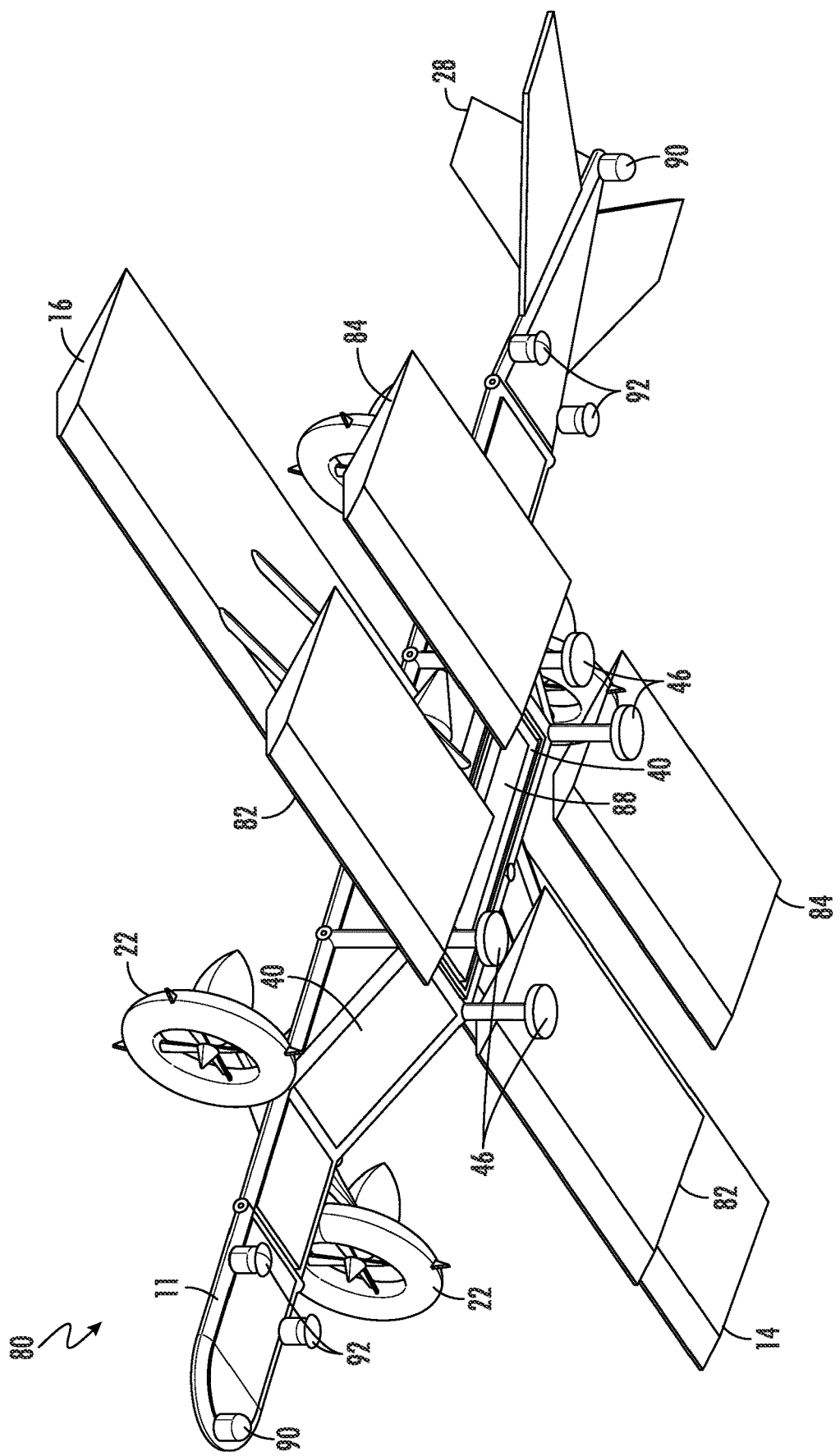
Figure 12C:
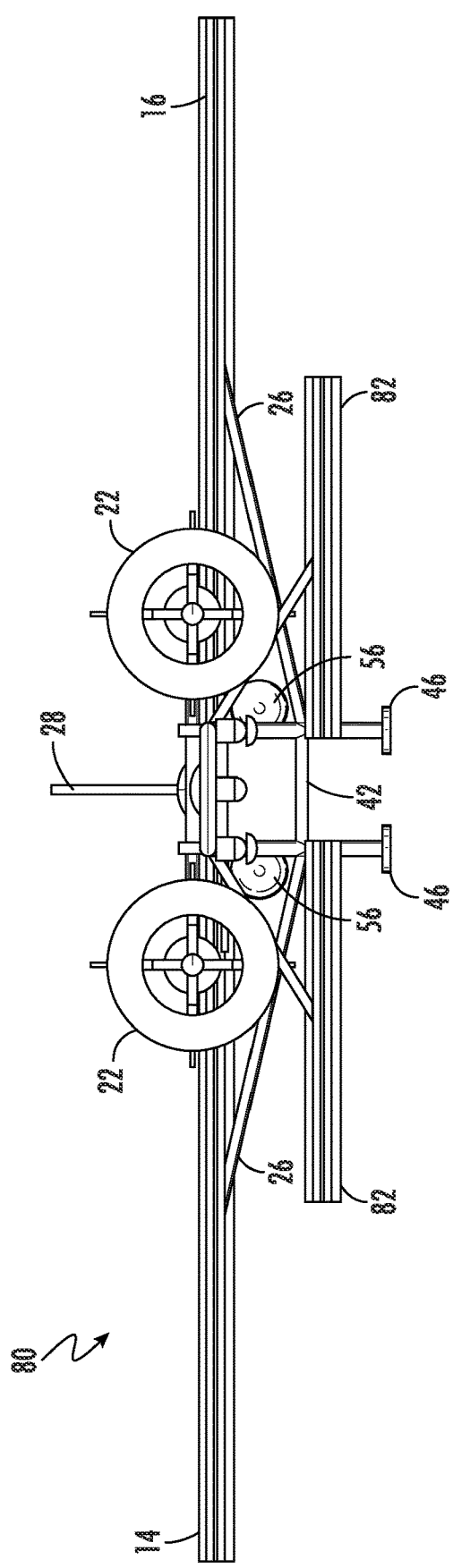
FIG. 12C is a front view of a drone, in accordance with some embodiments.
Figure 12D:
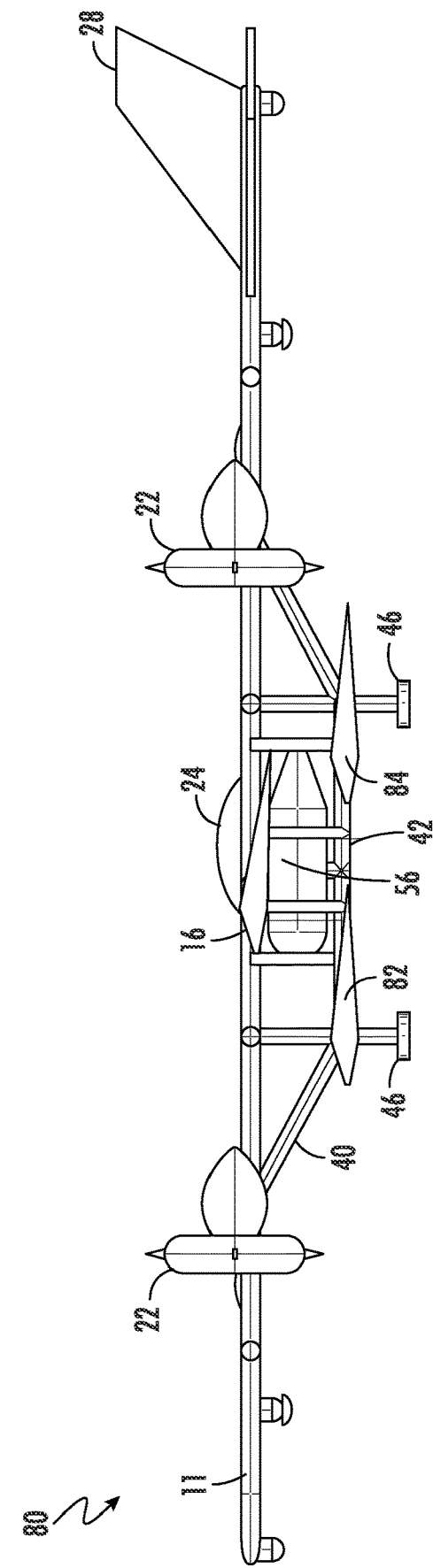
FIG. 12D is a side view of a drone, in accordance with some embodiments.
Figure 12E:
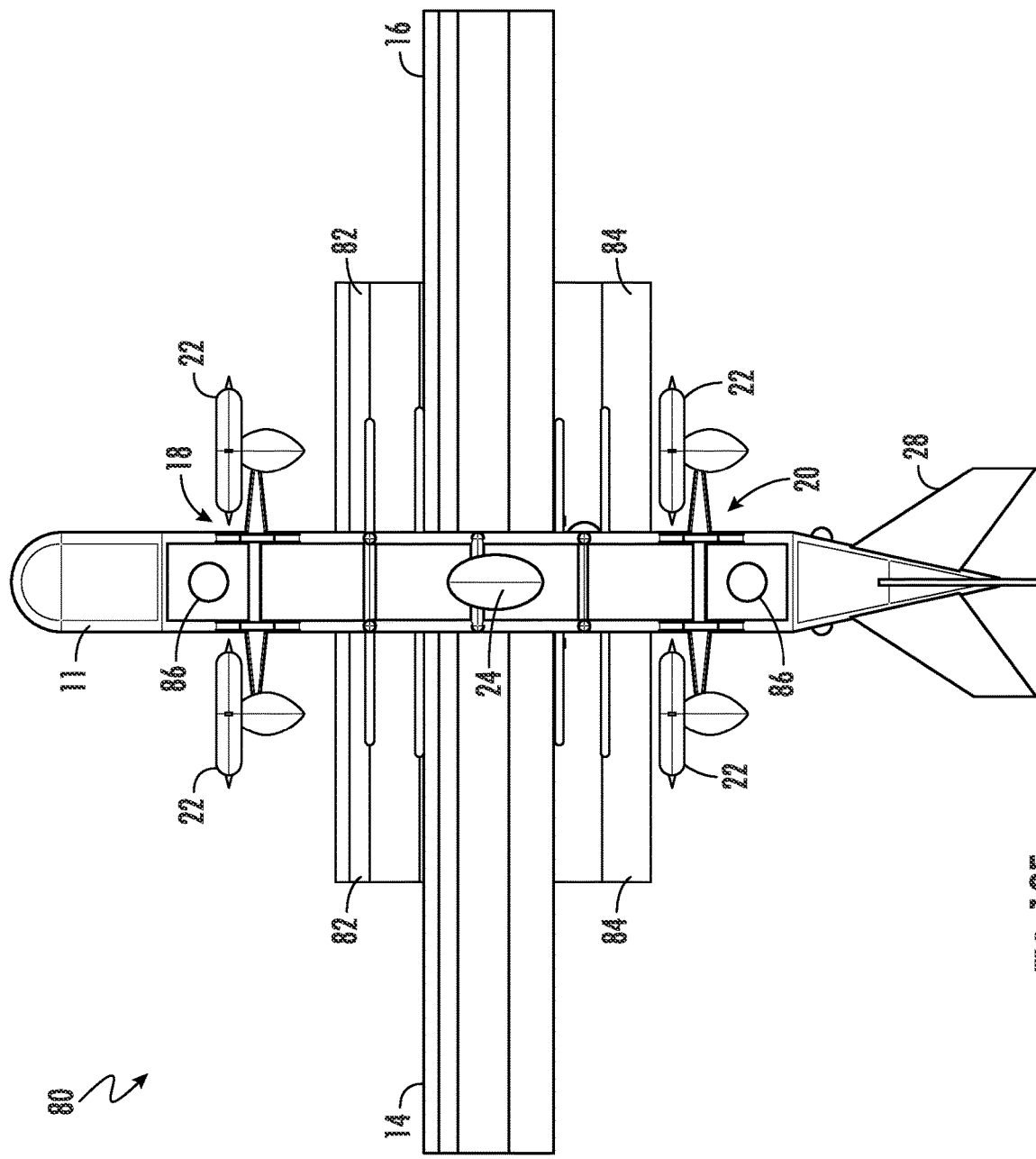
FIG. 12E is a top view of a drone, in accordance with some embodiments.
Figure 12F:
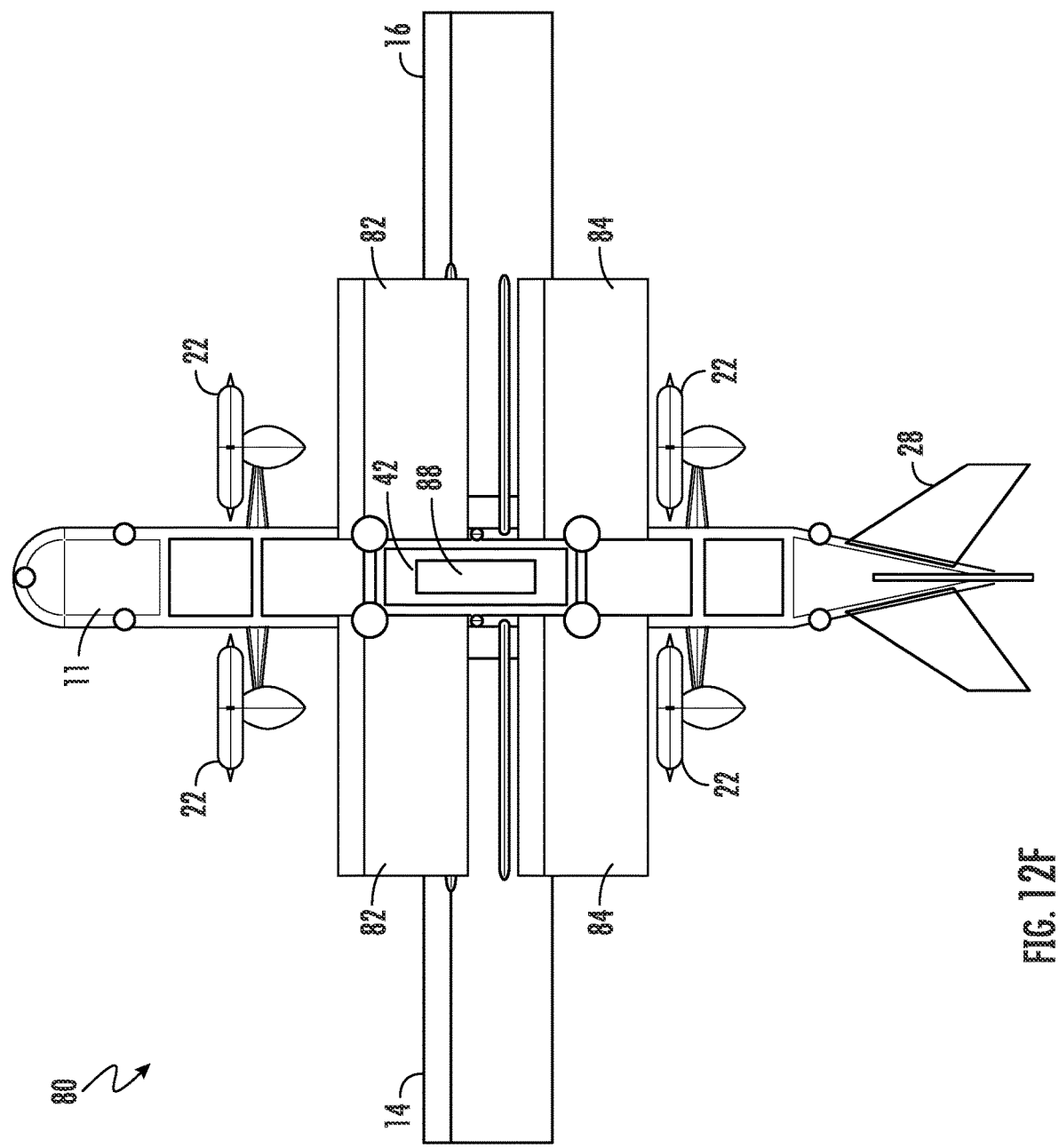
FIG. 12F is a bottom view of a drone, in accordance with some embodiments.

In some embodiments, a drone 80 is similar to drone 10 as described herein and includes subwings. In accordance with some embodiments, FIGS. 12A and 12B are perspective views of drone 80, FIG. 12C is a front view of drone 80, FIG. 12D is a side view of drone 80, FIG. 12E is a top view of drone 80, and FIG. 12F is a bottom view of drone 80. The drone 80 includes a first subwing 82 coupled to the front section 32 of the frame 11 frontward of the first wing 14 and the second wing 16, and extends outwardly from opposite sides of the frame 11. A second subwing 84 is coupled to the rear section 36 of the frame 11 rearward of the first wing 14 and the second wing 16, and extends outwardly from opposite sides of the frame 11. A length of the first subwing 82 and the second subwing 84 are less than a length of the first wing 14 and the second wing 16.

The first subwing 82 and the second subwing 84 are constructed as described herein similar to the first wing 14 and the second wing 16 as detailed in FIGS. 4A and 4B. For example, the first subwing 82 and the second subwing 84 are comprised of a frame structure which includes a plurality of structural segments, such as a plurality of wing segments 48 and a plurality of wing rods 50 connected together with the wing cover 54. The plurality of wing segments 48 and the plurality of wing rods 50 may be comprised of a carbon-fiber, aluminum, steel, composite material or combination thereof. The cross-sectional shape of the first subwing 82 and the second subwing 84 may be an aerodynamic shape such as an airfoil. The first subwing 82 and the second subwing 84 add area to the drone 80 thereby increasing the lift of the drone 80.

Figure 13:
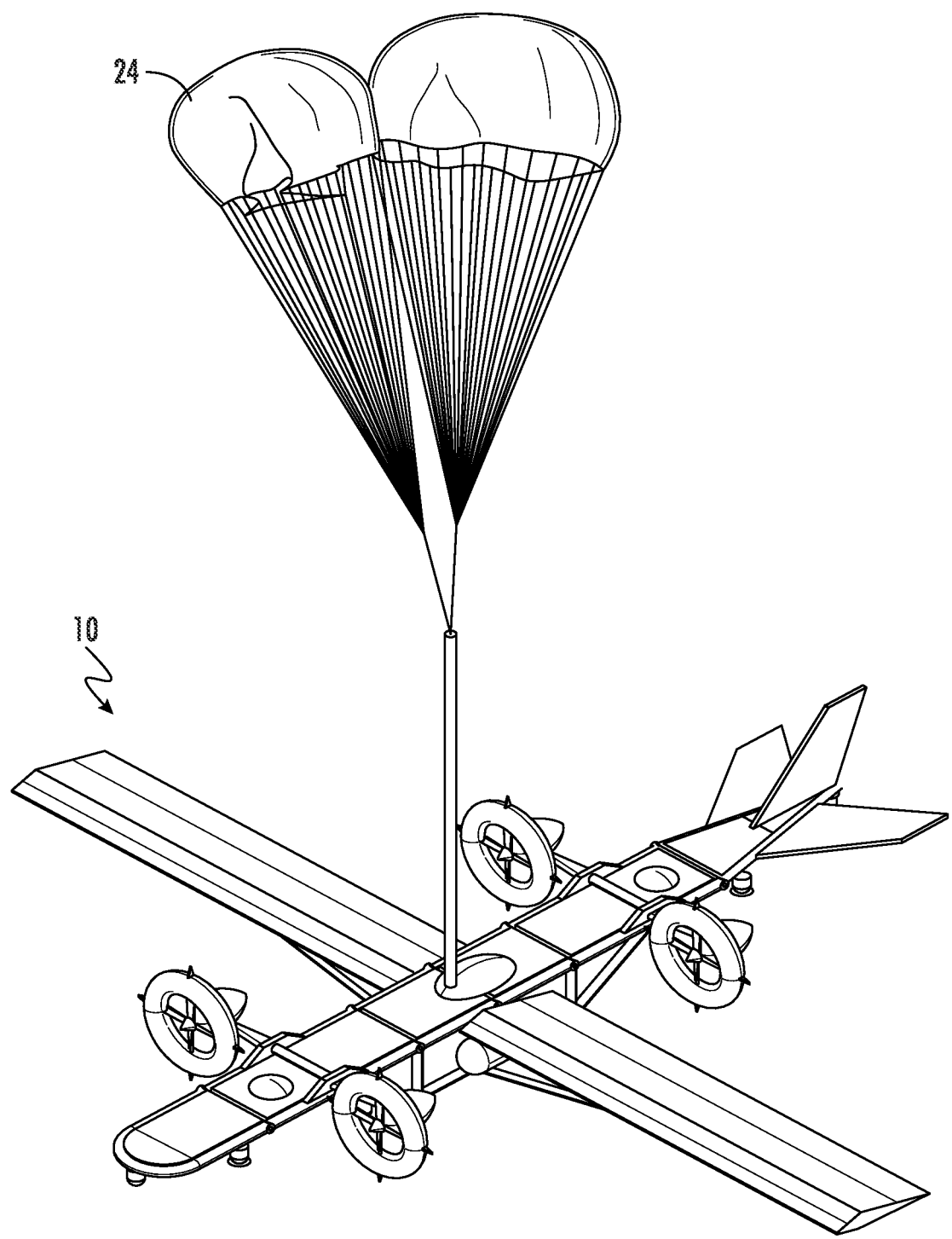
FIG. 13 is a perspective view of a drone with a parachute system deployed, in accordance with some embodiments.

FIG. 13 is a perspective view of the drone 10 with a parachute system 24 deployed, in accordance with some embodiments. Referring to FIGS. 1A and 12A, the drones 10 and 80 may include a parachute system 24 stored in the center section 34 of the frame 11. The parachute system 24 may be deployed in an emergency situation so the drone 10 or drone 80 can be recovered. The parachute system 24 may be stored on the top surface of the frame 11 and positioned to deploy. The parachute system 24 is sized to support a weight of the drone 10 or drone 80. In some embodiments, the parachute system 24 may be deployed when landing to conserve fuel for cost benefits. The ability to have the parachute system 24 that can carry the weight of the entire drone 10 or drone 80 is possible due to the lightweight design of the drone 10 and drone 80.

FIG. 14A shows a formula for calculating lift, where the lift coefficient is $C_L$, the lift is L, the fluid density is p, the velocity of the drone is V, and the wing area is A. FIG. 14B shows Table 14B of sample calculations of wing area of the drone 80, and FIG. 14C shows Table 14C of sample calculations for lift of the drone 80, in accordance with some embodiments. For example, in Table 14B, the wing area may be calculated in order to calculate the lift of the drone 80. The first wing 14 and the second wing 16 may each have a length of 35 feet and a width of 10 feet. The first subwing 82 and the second subwing 84 may each have a length of 35 feet and a width of 10 feet. Therefore the total wing area may be 1400 ft². FIG. 14C is a table of a sample calculation for the lift of the drone 10, in accordance with some embodiments. For example, based on the formula in FIG. 14A and the wing area calculated in Table 14B of FIG. 14B, the lift is about 4,108.23 kg force at 70 km/hr (where $C_L$=1.45; wing as plain airfoil design), or 3,935.49 kg force at 55 km/hr ($C_L$=2.25; wing as plain flap design). FIG. 14D is a chart of wing design profiles and lift coefficient $C_L$.

The drone 10 and drone 80 are lightweight and designed to hover in a small area for days. The drone 10 or drone 80 can be positioned up to 3 km or 10,000 feet above the ground and effectively provide satellite and broadband communication to an area. In contrast, thousands of conventional Low Earth Orbit (LEO) satellites are needed to provide satellite communications to the same sized area that can be covered by one drone 10 or one drone 80. The LEO satellites are positioned 350 km to 1,000 km above the ground and orbit the earth. Many LEO satellites are needed to service the same sized area because the LEO satellites are constantly orbiting the earth, so when one LEO satellites moves out of range, another LEO satellite is needed to take over. LEO satellites have a high cost of hardware cost and implementation. In general, the further away the satellite is positioned, the more power is required to transmit.

Figure 15:
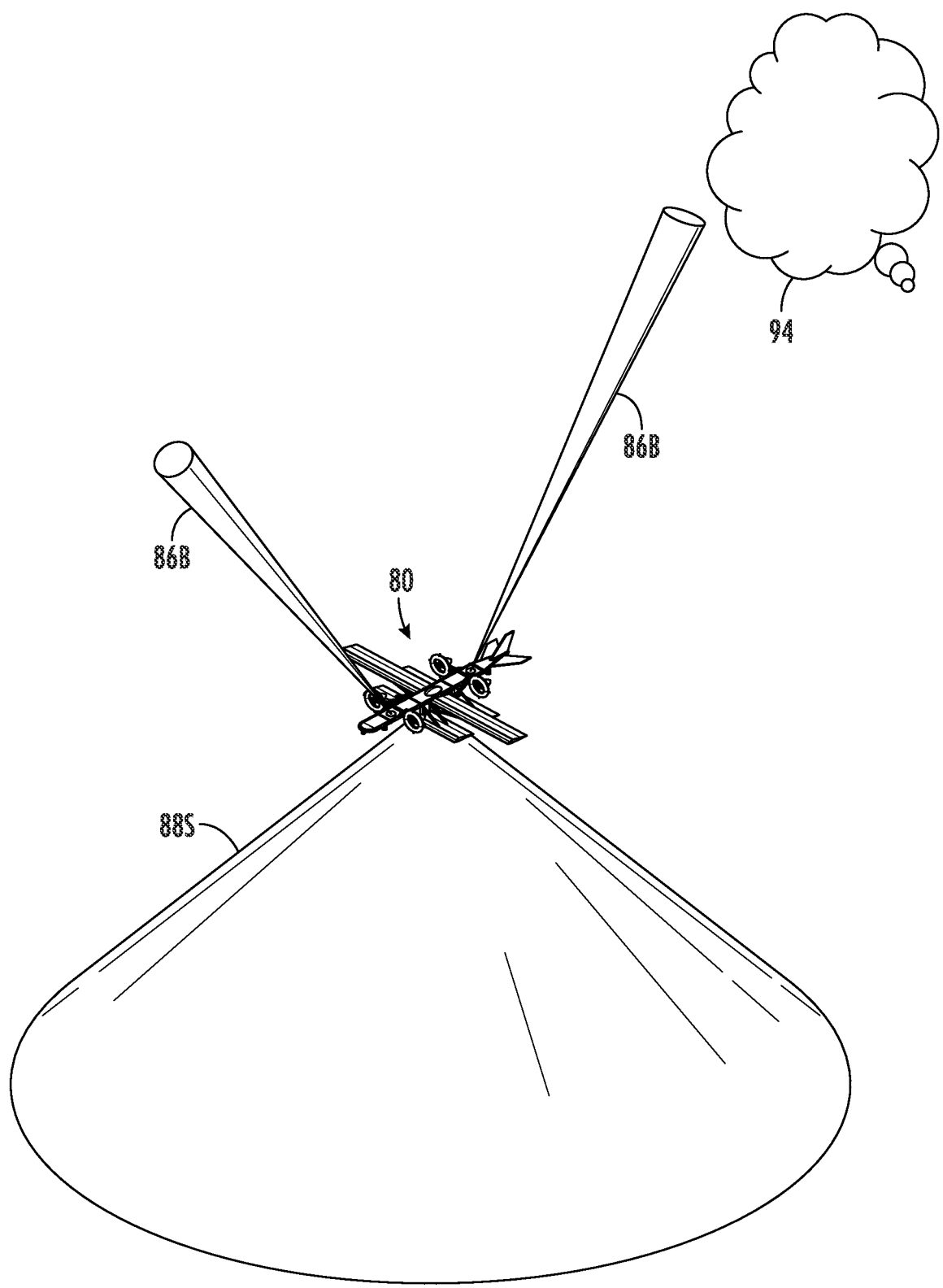
FIG. 15 illustrates a perspective view of the drone in service as a base station, in accordance with some embodiments.

FIG. 15 illustrates a perspective view of the drone 80 in service as a base station, in accordance with some embodiments. The drone 80 (or drone 10, not shown) is a wireless communications base station positioned up to 3 km from the ground. The drone 80 utilizes a first antenna array 86 and an adjustable second antenna array 88 mounted on the drone 80 to provide satellite and broadband communication service among subscribers or user equipment in an area.

Also referring to FIGS. 1A and 12A, a first antenna array 86 is coupled to the top surface of the frame 11 and has a first processing unit (not shown). There may be more than one location on the top surface of the frame 11 having a first antenna array 86 depending on the application. For example, FIGS. 1A and 12A show the first antenna array 86 in two locations such as on the front section 32 of the frame 11 and on the rear section 36 of the frame 11. The first antenna array 86 is configured for satellite communication and may use mmWave technology at 20 Gbps. In FIG. 15, beams 86B represent signals sent from each first antenna array 86 via satellite communication and connects the subscriber or user equipment to the internet cloud 94. When compared to the LEO satellites for providing satellite communication, the drone 80 utilizes less hardware, less power requirements for transmitting, less cost, and is faster to implement.

Figure 16:
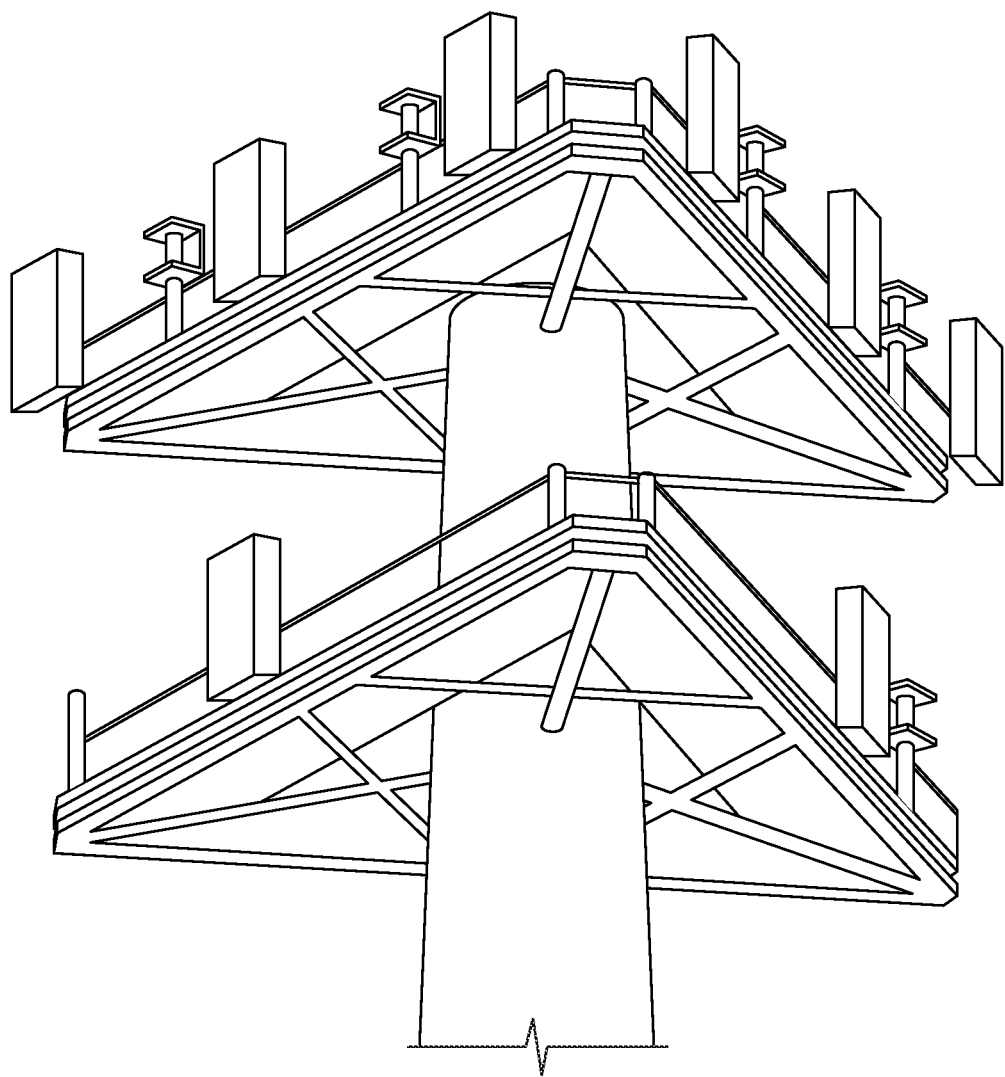
FIG. 16 shows a conventional prior art tower-based base station.

FIG. 16 shows a conventional prior art tower-based base station. In conventional systems, the tower-based base station consists of three panels of antennas. Three panels are needed and are mounted on the tower to provide 360° coverage/communication for subscribers or user equipment. For broadband communication, tower-based base stations may use existing 4G towers to implement 5G networks. One of the distinguished differences between 4G and 5G wireless communications is that 4G uses radiated wide-angle in the low-band frequencies while 5G uses beamforming such as narrow angle and directional, to improve the service on the mid-band frequencies. 5G has about 100 times the bandwidth than 4G. Beamforming sends a single focused signal to each and every user in the cell, and systems monitor each user to ensure a consistent signal. High-band spectrum or mmWave can have peak speeds up to 20 Gbps over a 20 km range with very low latency but may have a low coverage area and building penetration is poor.

5G may be used for cell towers to central switching station point-to-point high-bandwidth wireless communications without the need for fiberoptic cable infrastructure. This is not easily interfered with unless the line-of-sight between the two communications points is blocked. Beamforming wireless communication transmits the same waveform/frequency on multiple/matrix/array MIMO antennas and phase shift properly on each of the antennas to forge an energy dense wireless communication beam in any direction (±150°) that directs to user equipment.

Referring to FIGS. 1B, 12B and 15, a second antenna array 88 is coupled to the bottom panel 42 and has a second processing unit (not shown). Similar to the first antenna array 86, there may be more than one location on a bottom surface of the drone 10 or drone 80 having a second antenna array 88. The second antenna array 88 is coupled to the bottom panel 42 of the drone 80 and is one, flat panel and adjustable about two axes, as described with reference to the bottom panel 42 (see FIGS. 3A-3D). The second antenna array 88 is configured for transmitting and receiving multi-beamforming signals 88S (see FIGS. 15, 17 and 18) for subscribers or user equipment in the designated area. The second antenna array 88 is comprised of a Multiple Input Multiple Output (MIMO) antenna. The second antenna array 88 may be a MIMO antenna, a plurality of MIMO antennas, an ultra-massive MIMO antenna, or a plurality of ultra-massive MIMO antennas. In some embodiments, each antenna of the second antenna array 88 may be dedicated to a single wireless vendor. In this way, multiple vendors can use the same base station or drone 80. The second antenna array 88 is adjustable via the bottom panel 42, since the second antenna array 88 is coupled to the outer surface of the bottom panel 42. This enables the second antenna array 88 to maintain a fixed position for large area of ground customer subscribers, and reduce complicated beamforming direction calculations because the drone 80 is hovering over the service area.

The drone 10 or drone 80 provides satellite communications via the top surface via the first antenna array 86, and provides 5G/6G wireless communications via the second antenna array 88 via the bottom surface. The drone 10 or drone 80 beneficially needs only one, adjustable panel (e.g., the bottom panel 42) of MIMO antennas to provide 360° coverage/communication with user equipment due to the bottom panel 42 being able to change angles with respect to the frame (see FIGS. 2 and 3A-3D) while utilizing beamforming technology. In contrast, tower-based base stations (FIG. 16) require three panels of MIMO antennas to provide 360° coverage/communication which is a fixed design.

Figure 17:
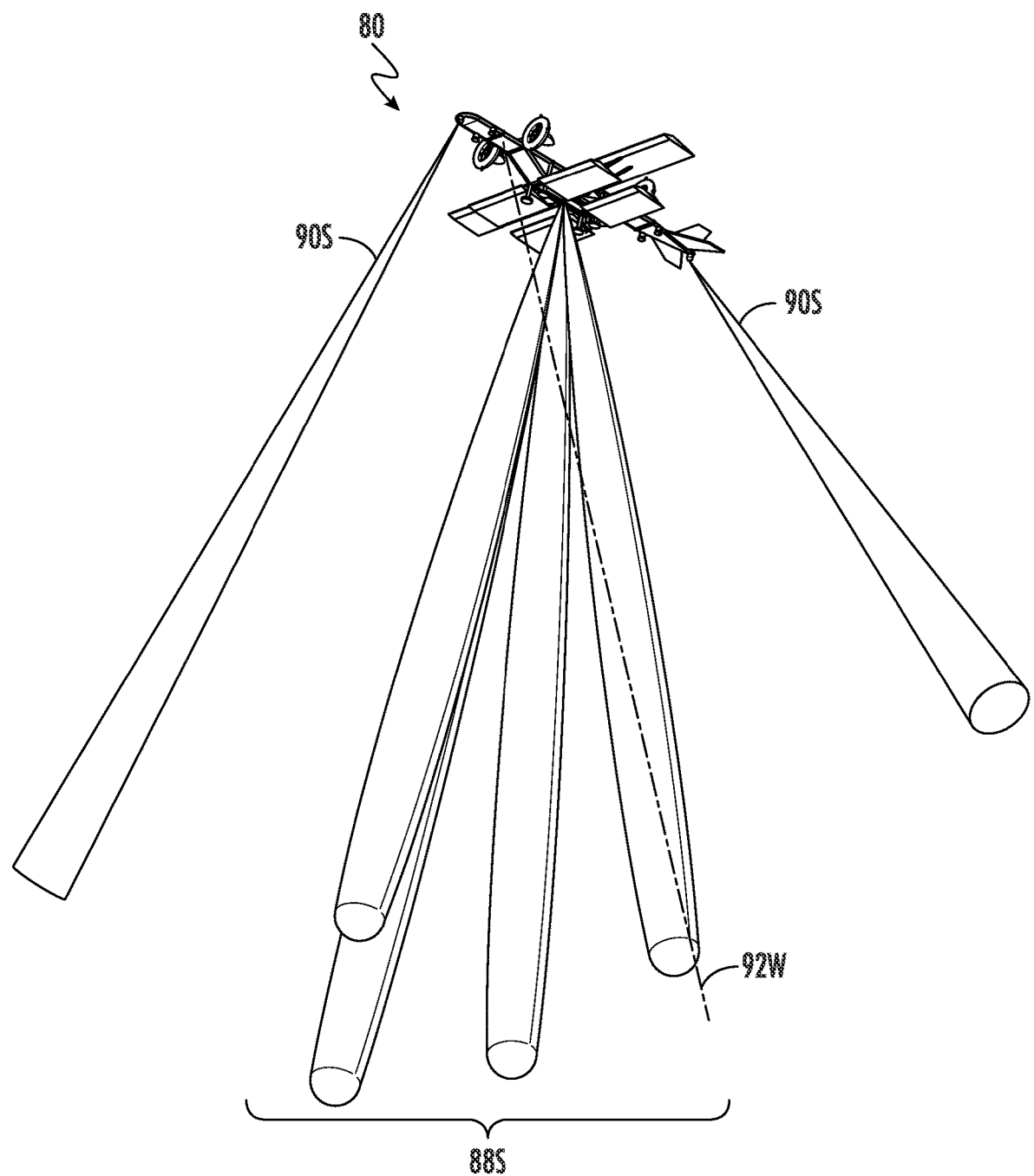
FIG. 17 illustrates a perspective view of the drone as a base station, in accordance with some embodiments.

FIG. 17 illustrates a perspective view of the drone 80 serving as a base station, in accordance with some embodiments. Also referring to FIGS. 1B and 12B, the drone 10 or 80 includes an electro-optical/infrared (EO/IR) system 90 to capture image data such as photos and videos for intelligence, surveillance, safety and the like. This may help save time and resources of law enforcement by providing and distributing information for public safety. For example, artificial intelligence (AI) may analyze the data for significant events to pin-point suspected areas for detailed surveillance or tracking.

The EO/IR system 90 has a plurality of imaging devices, a plurality of sensors, at least one brushless motor and a gimbal. The EO/IR system may be mounted on the drone 10 or drone 80 such as near the first end of the frame 11 and/or near the second end of the frame 11, and is configured to adjust the imaging device to a set angle while capturing image data when the drone 10 or drone 80 is in motion. The EO/IR system signal from the EO/IR system 90 is shown as 90S in FIG. 17. For example, the EO/IR system may use a high-definition camera and sensor to provide a high-quality image at any angle to the ground within 32 km. The gimbal of the EO/IR system may move the imaging device, (e.g., camera) to any particular angle and provide a stable focal position while the drone 10 or drone 80 is in motion. The sensor operates in daytime light, nighttime light and infrared such as long-range infrared search and tracking. This may be similar to identifying targets by infrared signatures.

Figure 18:
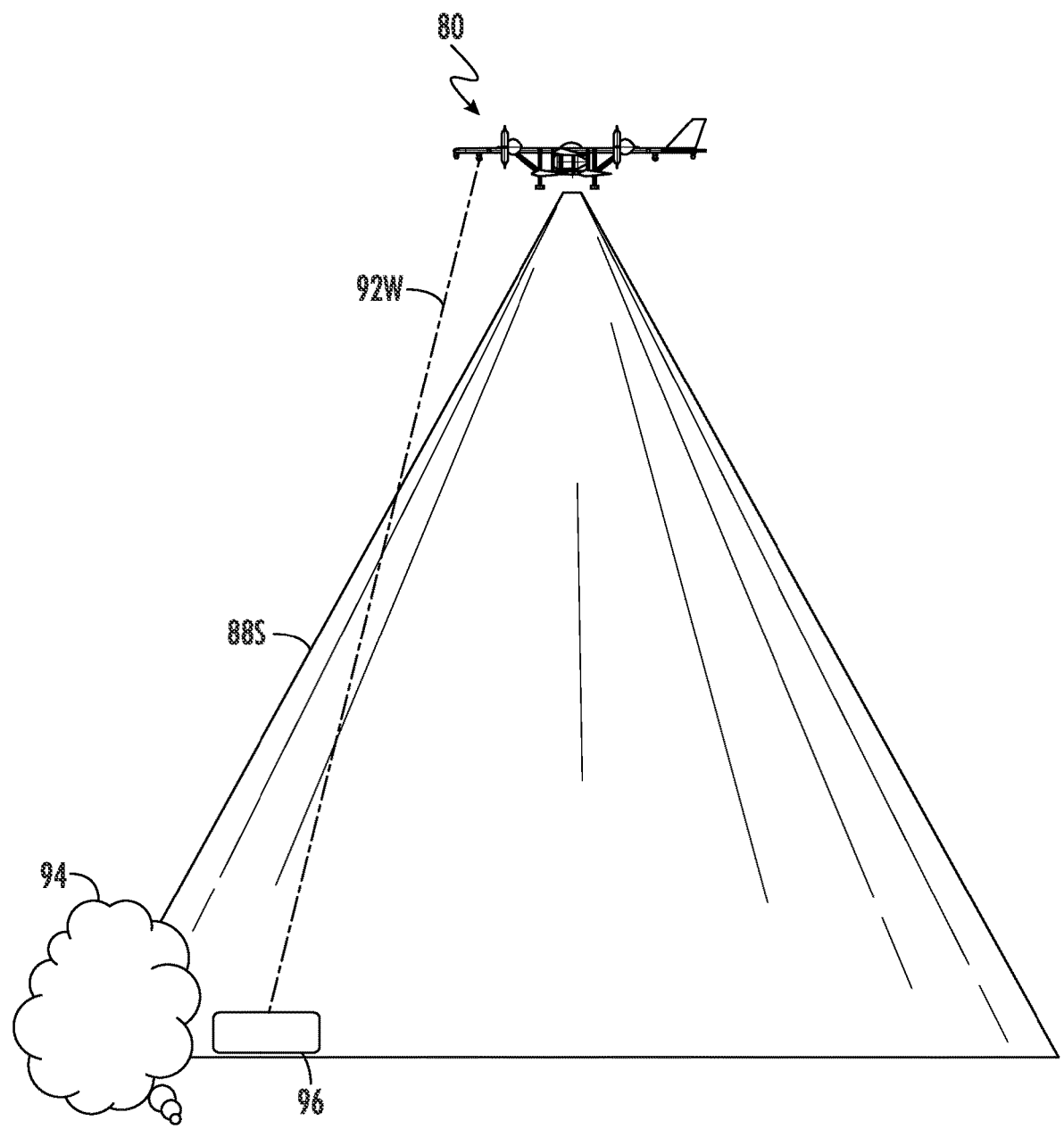
FIG. 18 depicts a front view of the drone as a base station, in accordance with some embodiments.

FIG. 18 depicts a front view of the drone 80 as a base station, in accordance with some embodiments. The drone 80 as a base station can connect subscribers or user equipment to an internet cloud by, for example, a 20 Gb/s mmWave Link to a ground station 96. When the drone 80 (or drone 10, not shown) is elevated off of the ground, it may hover at 120 meters to 20 km from the ground, subject to FAA approval. Due to the adjustable angle of the bottom panel 42 which the second antenna array 88 is coupled to, the second antenna array 88 is adjustable about two axes. The line-of-sight service area for 5G/6G beamforming (label 88S) may be, for example, up to a 122.5-mile radius area or 245-mile diameter. A plurality of turrets 92 (FIGS. 1A, 1B, 12A, 12B) comprises a wireless communication controller to communicate millimeter-wave (mmWave) signals with a wireless communication device over a mmWave frequency band. Data may be transferred via the plurality of turrets 92 which is a 5G mmWave wireless point to point link (labeled as 92W in FIG. 17) at a high-speed data rate of, for example, 1-20 Gbps for 5G and 1 Tbps for 6G for the user equipment. The second antenna array 88 (via a switching unit, not shown) streams the multi-beamforming signals (label 88S) via the plurality of turrets 92 and connects to the ground station 96 (or a plurality of ground stations 96) or to the internet cloud 94.

The image data may be aggregated and transmitted through the plurality of turrets 92. This may be an antenna and transceiver for wireless communication via 5G wireless communication and may use MIMO communications. This may transmit up to 20 Gbps. The drone 10 or drone 80 may integrate future 6G and/or 7G technology for high-bandwidth, long distance and secure wireless communications.

The drone 10 or drone 80 when used as a base station, enables a wireless communication to be deployed from anywhere particularly because of its vertical take-off capability, versus conventional systems of the fixed cell tower. When the drone 10 or drone 80 is elevated off the ground, the first antenna array 86 coupled to the top surface of the frame 11 is configured for satellite communication (label 86B in FIG. 15). The second antenna array 88 coupled to the bottom surface of the drone 10 or drone 80 is configured for transmitting and receiving multi-beamforming signals (label 88S) for user equipment using, for example, MIMO technology via 5G/6G beamforming. The EO/IR system 90 is configured to capturing image data (label 90S). The plurality of turrets 92 coupled to the drone 10 or drone 80 provide the 5G mmWave wireless point to point link (label 92W).

Referring to FIGS. 15 and 17-18, the drone 80 may hover, for example, at or below 3 km or 10,000 feet. One feature of the beamforming is that it uses a plurality of small planar antennas which forges an electromagnetic wave beam that is directed about a 150° wide angle. This enables the effective distance of a 122.5-mile radius area or 245-mile diameter of beamforming providing a greater amount of data links to serve more subscribers and user equipment in a wider service area when compared to conventional tower-based base stations. The design of the drone 80 is low-cost, fast implementation, low maintenance and has flexibility over tower-based 5G base stations. The drone 80 uses only one flat panel using MIMO antennas (e.g., second antenna array 88) facing the ground to cover 360° of user equipment. As described, the second antenna array 88 is adjustable in two axes which helps to enable this beneficial feature. In some embodiments, second antenna array 88 is comprised of a plurality of MIMO antennas or ultra-massive MIMO antennas. In contrast, the tower-based base station requires at least three flat panels arranged vertically 120° apart to cover 360° omnidirectional of user equipment. For example, the tower-based base station uses an omnidirectional antenna which radiates radio wave power uniformly in all directions in one plane, with the radiated power decreasing with elevation angle above or below the plane, and dropping to zero on the antenna's axis. In contrast, the angle of the second antenna array 88 coupled to the bottom panel 42 of the drone 80 relative to the frame 11 of the drone 80 is adjustable in two axes.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A drone system comprising:
   a frame;
   a fuselage coupled to a bottom surface of the frame extending away from the frame, the fuselage having a front panel and a bottom panel, the front panel positioned at an angle between the bottom surface of the frame and the bottom panel of the fuselage, and the bottom panel pivotably coupled to the fuselage;
   a first wing opposite a second wing, the first and second wings coupled to the frame, the first and second wings extending outwardly from opposite sides of the frame;
   a first subwing coupled to the frame positioned forward of the first and second wings, and extending outwardly from opposite sides of the frame;
   a second subwing coupled to the frame positioned rearward of the first and second wings, and extending outwardly from opposite sides of the frame;
   a first mounting member coupled to the frame and extending outwardly from opposite sides of the frame;
   a second mounting member coupled to the frame and extending outwardly from opposite sides of the frame; and
   a plurality of power generator systems, each power generator system coupled to the first mounting member or the second mounting member and wherein each power generator system comprises a power source coupled to a propeller driving the propeller.

2. The drone system of claim 1, wherein the frame, the fuselage and the first and second wings each comprise a plurality of structural elements and each form a desired shape, the plurality of structural elements comprising carbon fiber, and each desired shape covered with a material.

3. The drone system of claim 1, wherein:
the propeller has a propeller axis of rotation; and
the propeller pivots between a first orientation and a second orientation, the second orientation perpendicular to the first orientation.

4. The drone system of claim 1, wherein the power source of one power generator system of the plurality of power generator systems comprises an axial flux motor.

5. The drone system of claim 1, wherein the power source is at least one turbine engine comprising:
  a) a turbine having a plurality of spokes, the plurality of spokes being spaced circumferentially around a shaft, each spoke of the plurality of spokes having a first spoke end and a second spoke end, the each spoke of the plurality of spokes extending along an axis between the first spoke end and the second spoke end, the first spoke end coupled to the shaft and the second spoke end coupled to a blade of a plurality of blades, wherein each blade of the plurality of blades is a hemispherical-shaped cup with an open surface and coupled to the second spoke end with the open surface;
  b) a plurality of dispensers being spaced circumferentially around the shaft, each dispenser of the plurality of dispensers comprising:
    a combustion chamber;
    an air injector coupled to the combustion chamber and configured to inject air of an air-fuel mixture into the combustion chamber;
    a fuel injector coupled to the combustion chamber and configured to inject fuel of the air-fuel mixture into the combustion chamber;
    an ignitor coupled to the combustion chamber and configured to supply a spark for combustion of the air-fuel mixture in the combustion chamber; and
    a nozzle having a first nozzle end coupled to the combustion chamber and a second nozzle end positioned to direct discharged fluid after combustion in the combustion chamber toward the open surface of the blade to drive the turbine; and
  c) a controller in communication with the each dispenser of the plurality of dispensers and configured to control the air injector, the fuel injector and the ignitor.

6. The drone system of claim 1, wherein:
the bottom panel has a first bottom panel axis of rotation and a second bottom panel axis of rotation perpendicular to the first panel axis of rotation:
the bottom panel pivots between a first position and a second position about the first bottom panel axis of rotation; and
the bottom panel pivots between a third position and a fourth position about the second bottom panel axis of rotation.

7. The drone system of claim 1, further comprising:
a plurality of first antenna arrays coupled to a top surface of the frame and having a first processing unit, the plurality of first antenna arrays transmitting and receiving satellite communication; and
a plurality of second antenna arrays coupled to an outer surface of the bottom panel of the fuselage and having a second processing unit, the plurality of second antenna arrays transmitting and receiving multi-beamforming signals.

8. The drone system of claim 7, wherein the plurality of the second antenna arrays comprise Multiple Input Multiple Output (MIMO) antennas.

9. The drone system of claim 7, wherein the satellite communication is 5G or 6G wireless communication.

10. The drone system of claim 7, further comprising a wireless communication controller to communicate millimeter-wave (mmWave) signals with a wireless communication device over a mmWave frequency band.

* * * * *